June 2, 1925. 1,540,700
C. W. McWANE
METHOD OF MAKING CAST IRON PIPES
Filed March 27, 1923 10 Sheets-Sheet 4
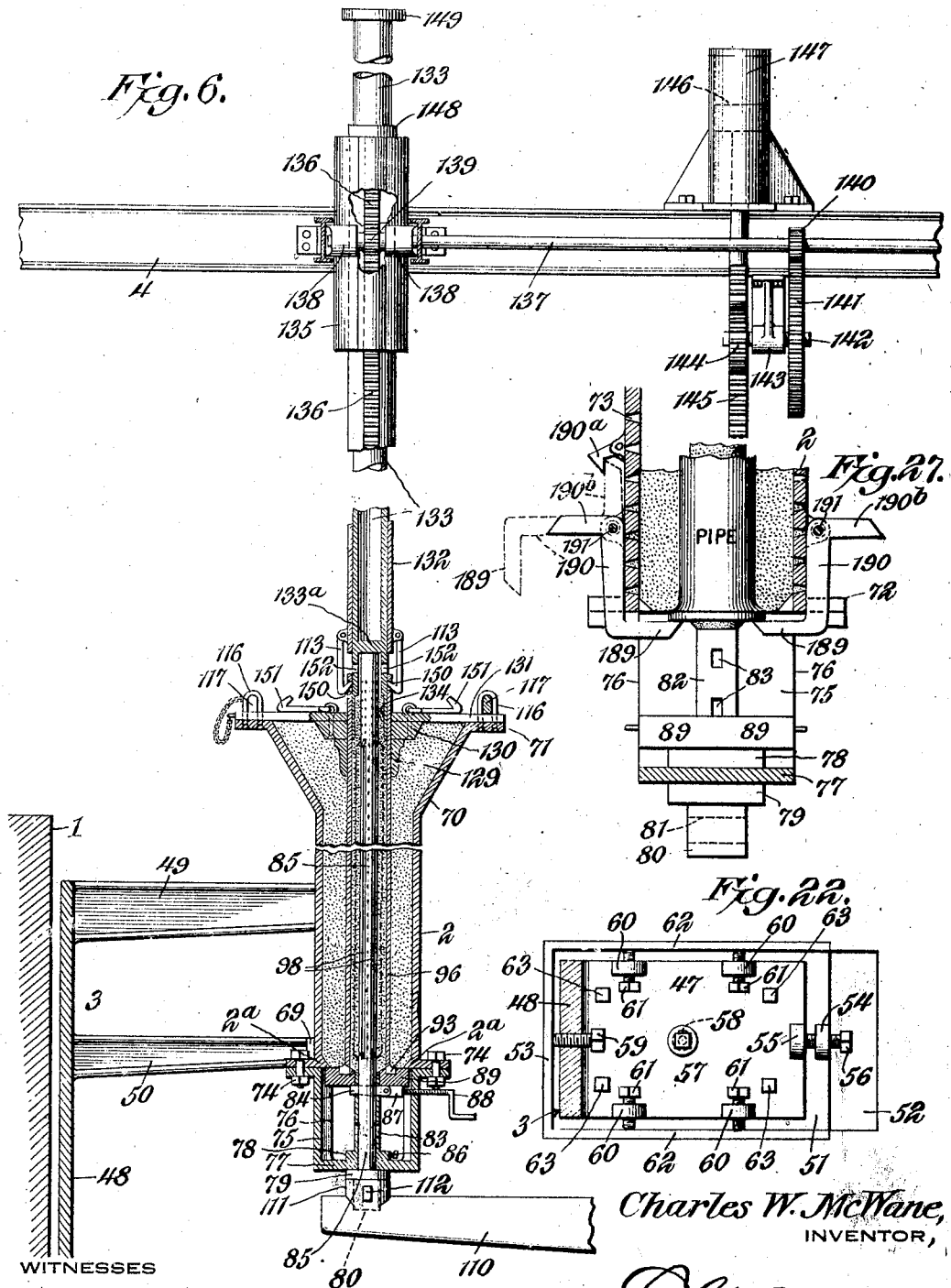

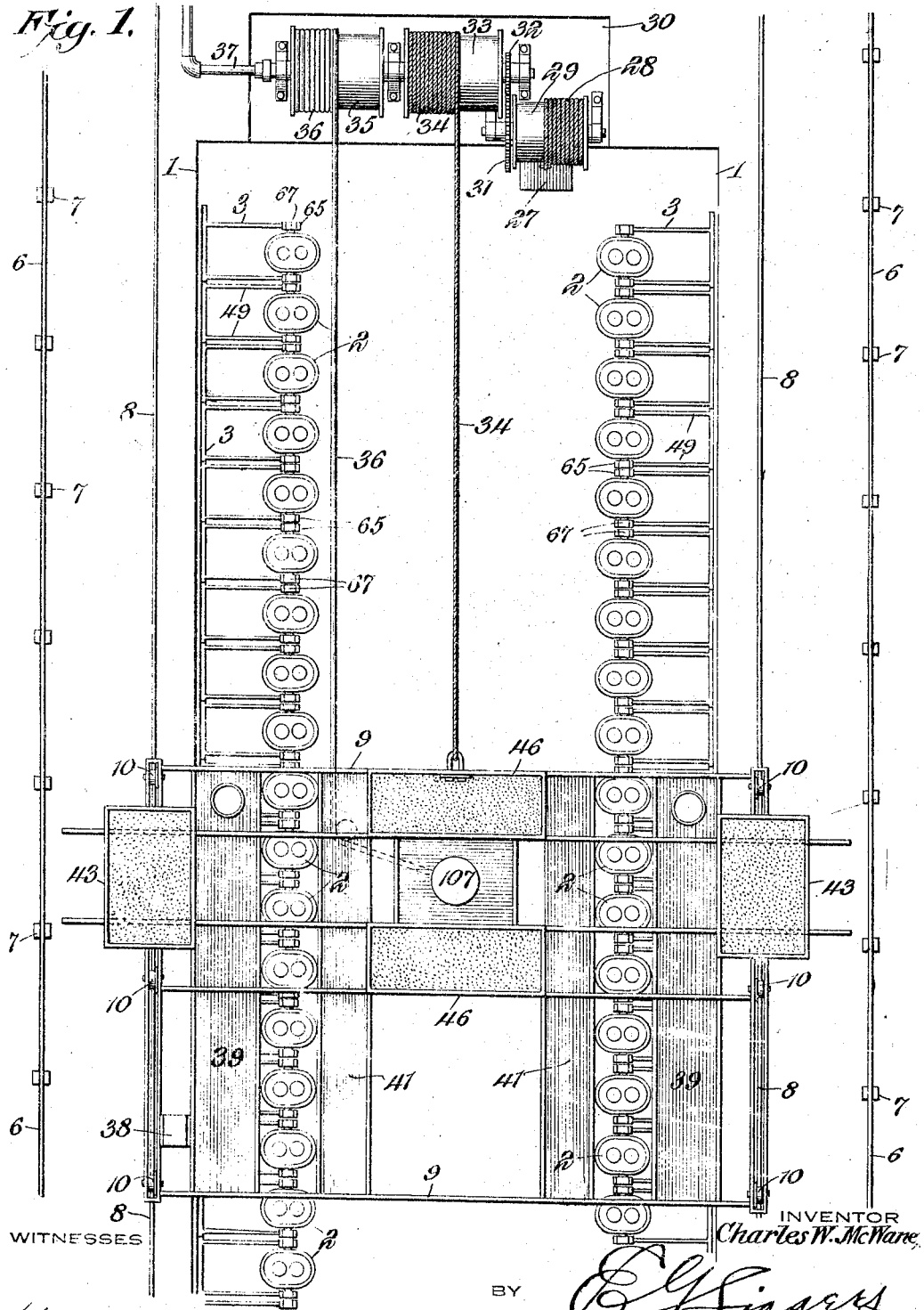

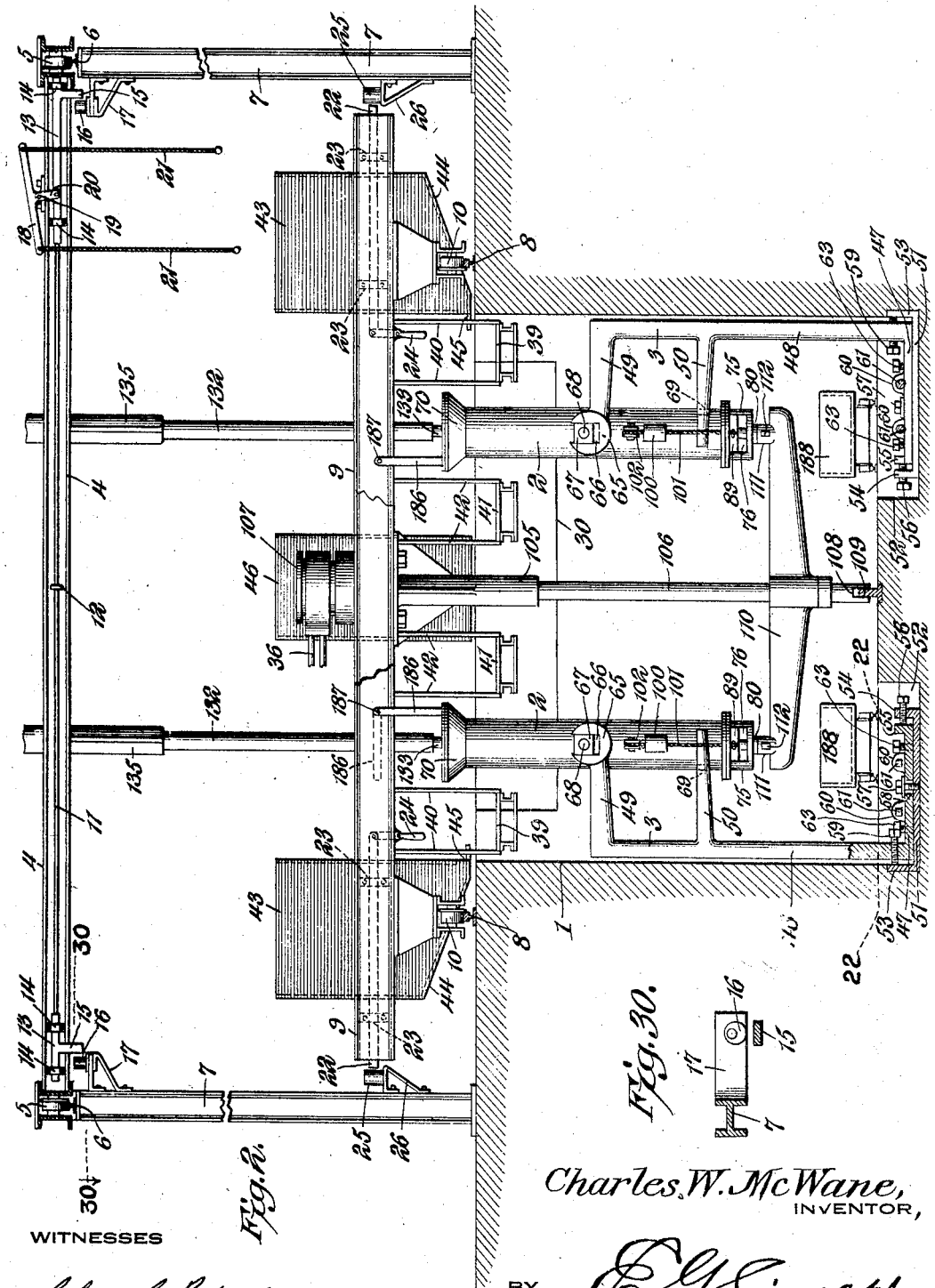

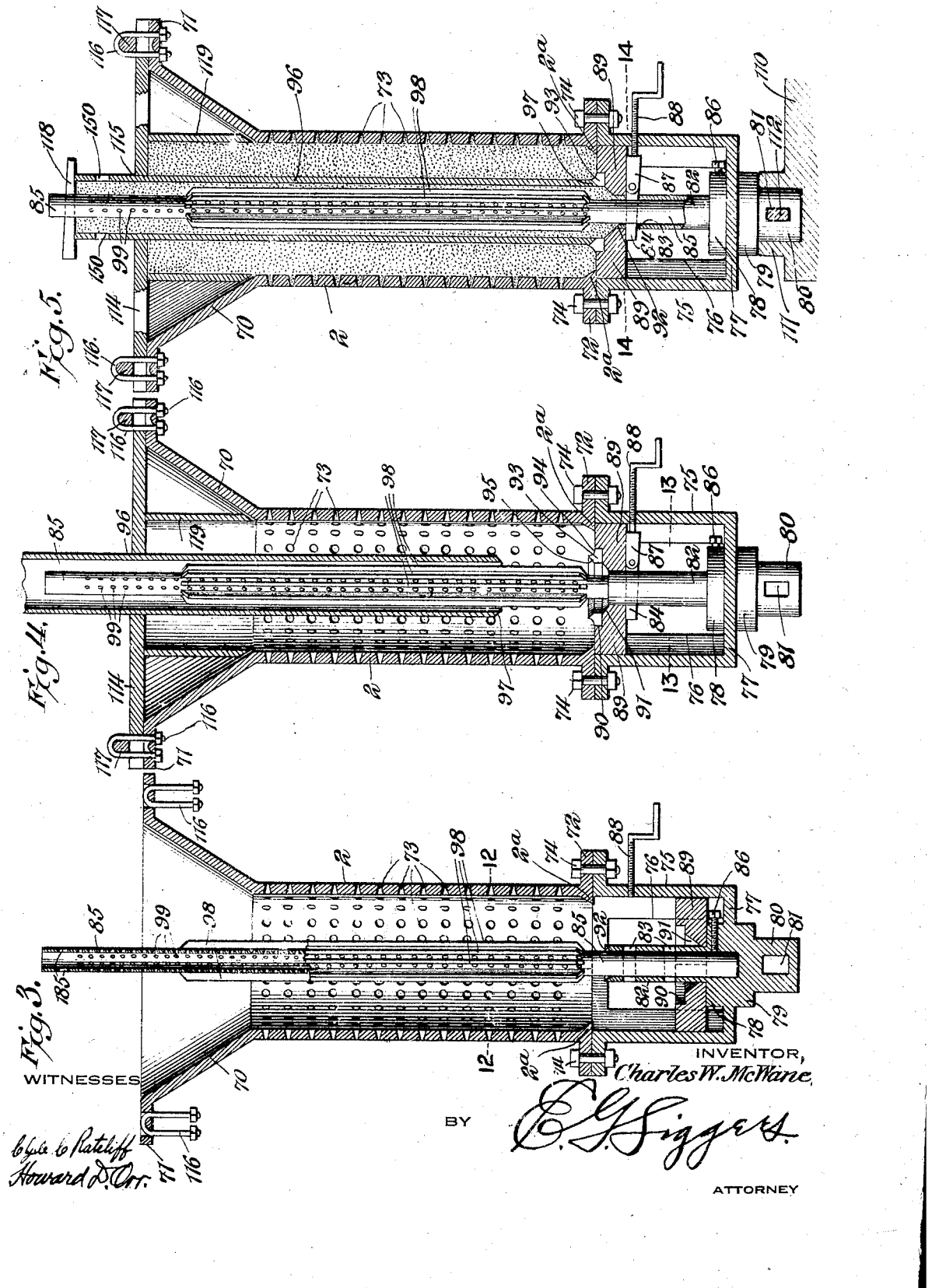

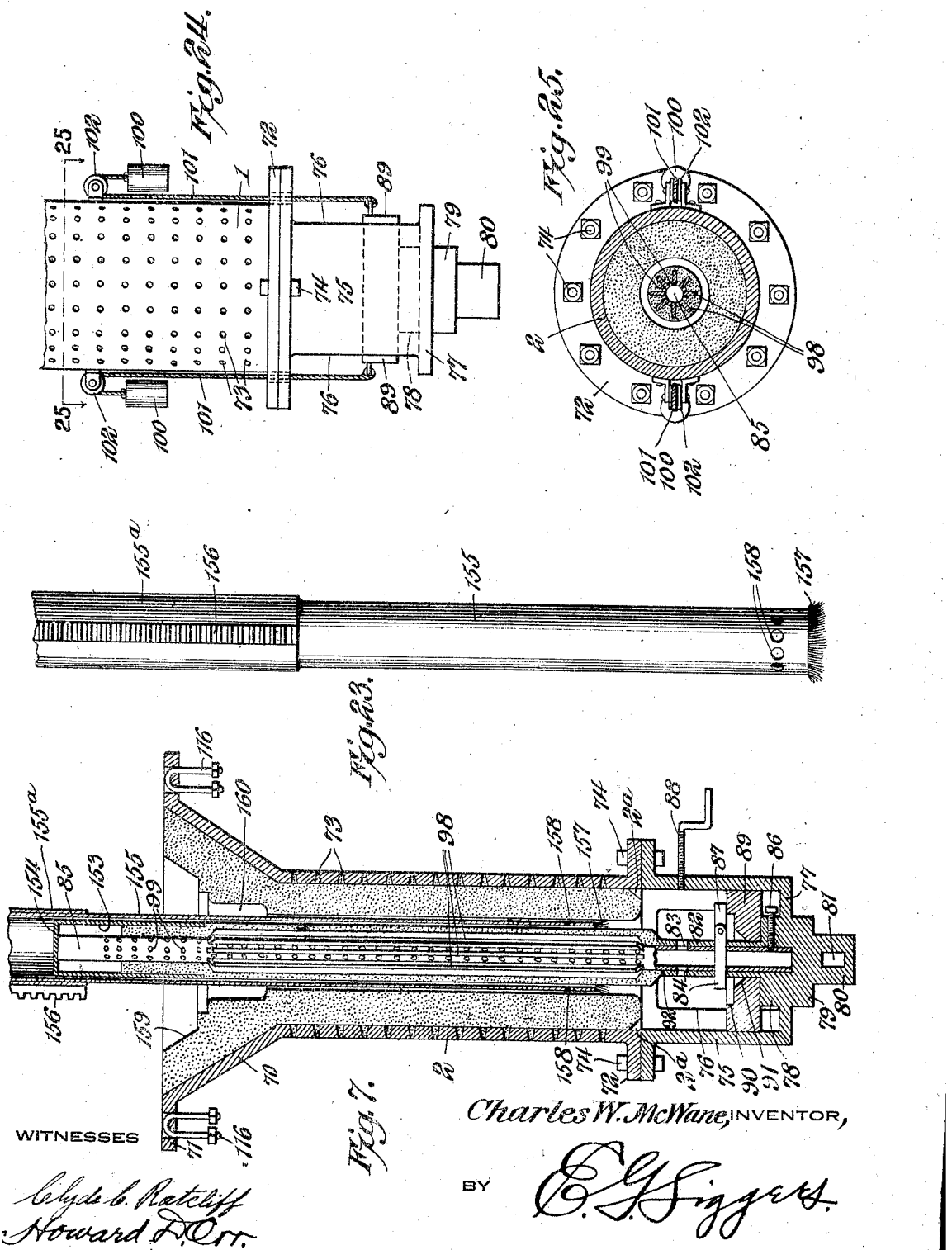

June 2, 1925.
C. W. McWANE
1,540,700
METHOD OF MAKING CAST IRON PIPES
Filed March 27, 1923    10 Sheets-Sheet 6
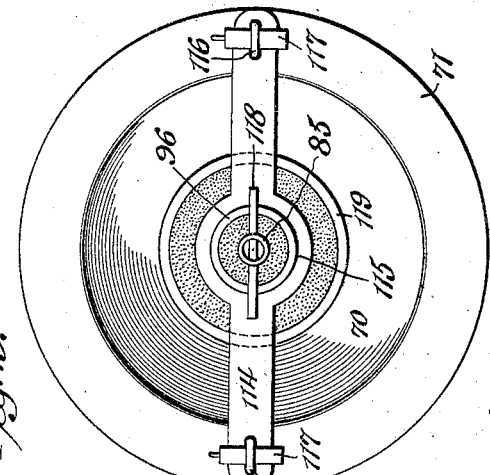
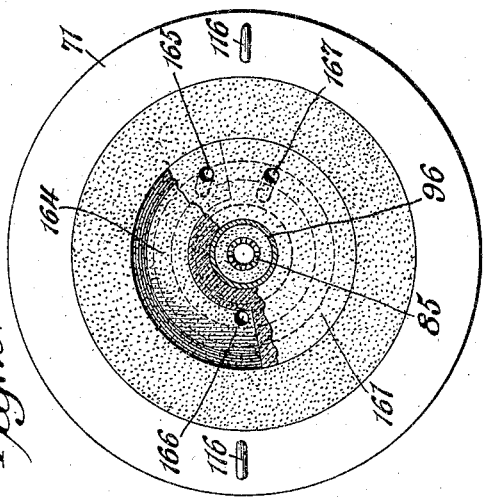
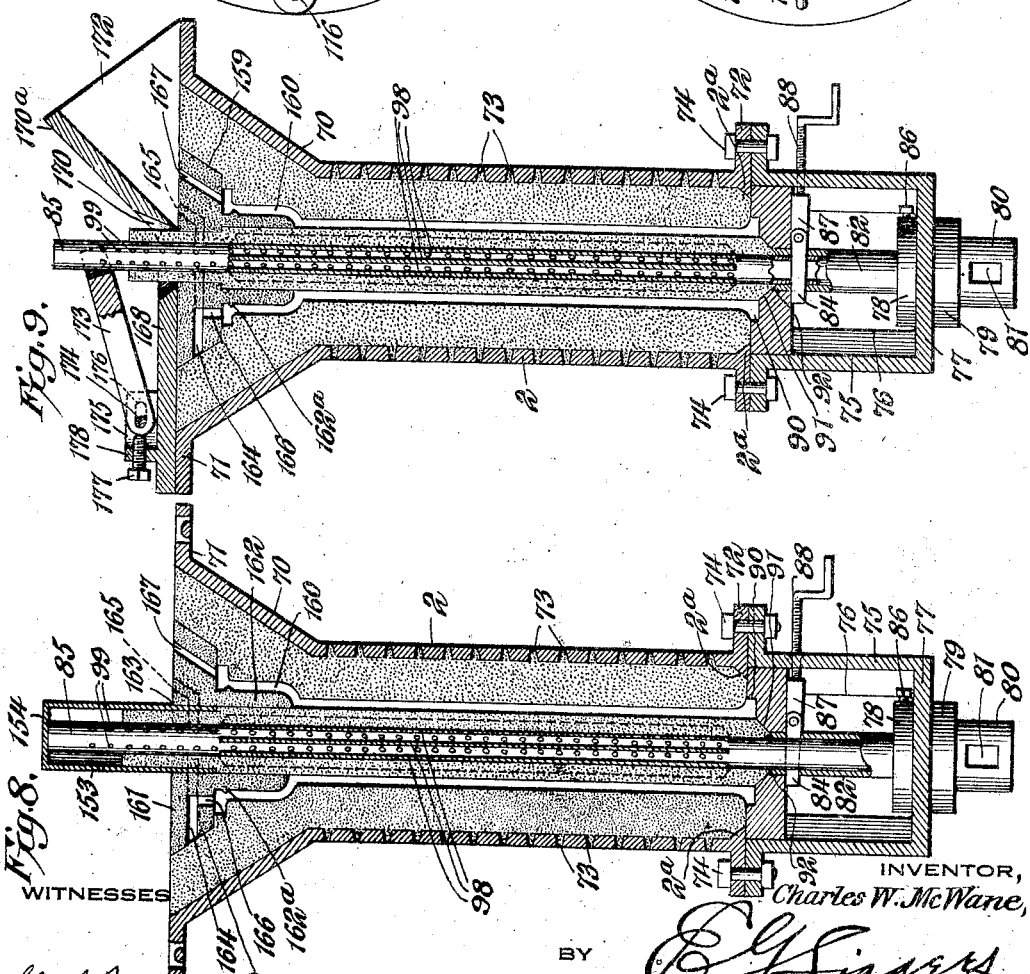
INVENTOR,
Charles W. McWane,
BY
ATTORNEY

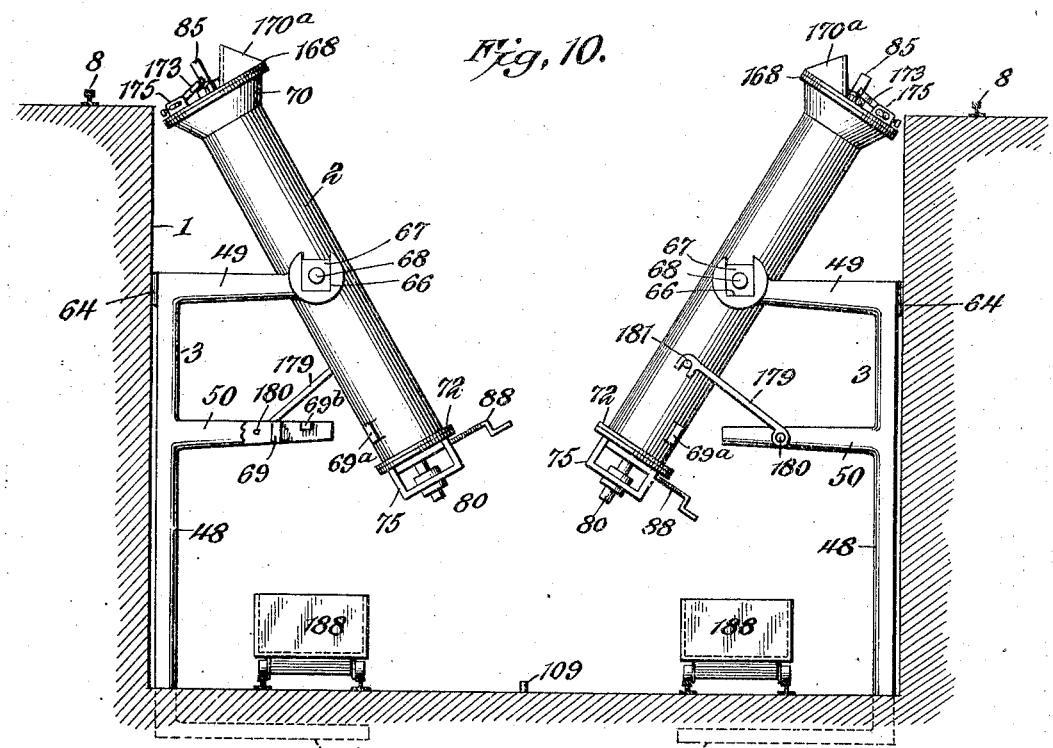
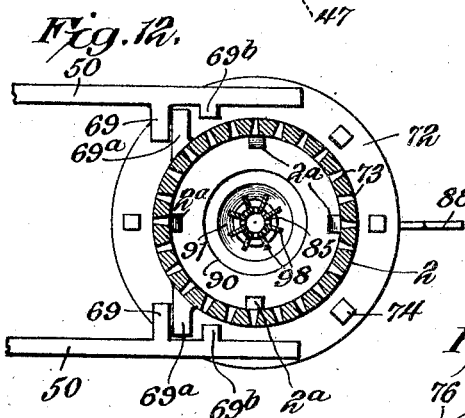
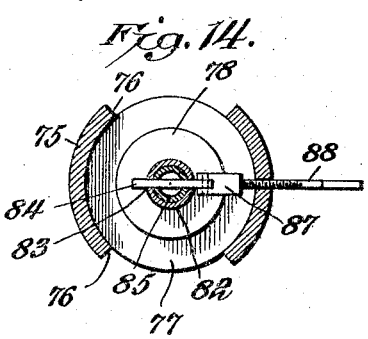
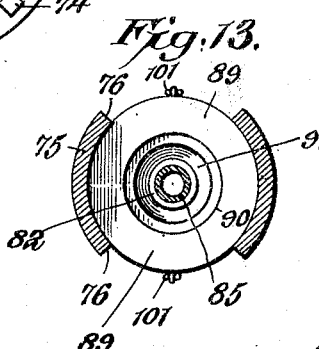

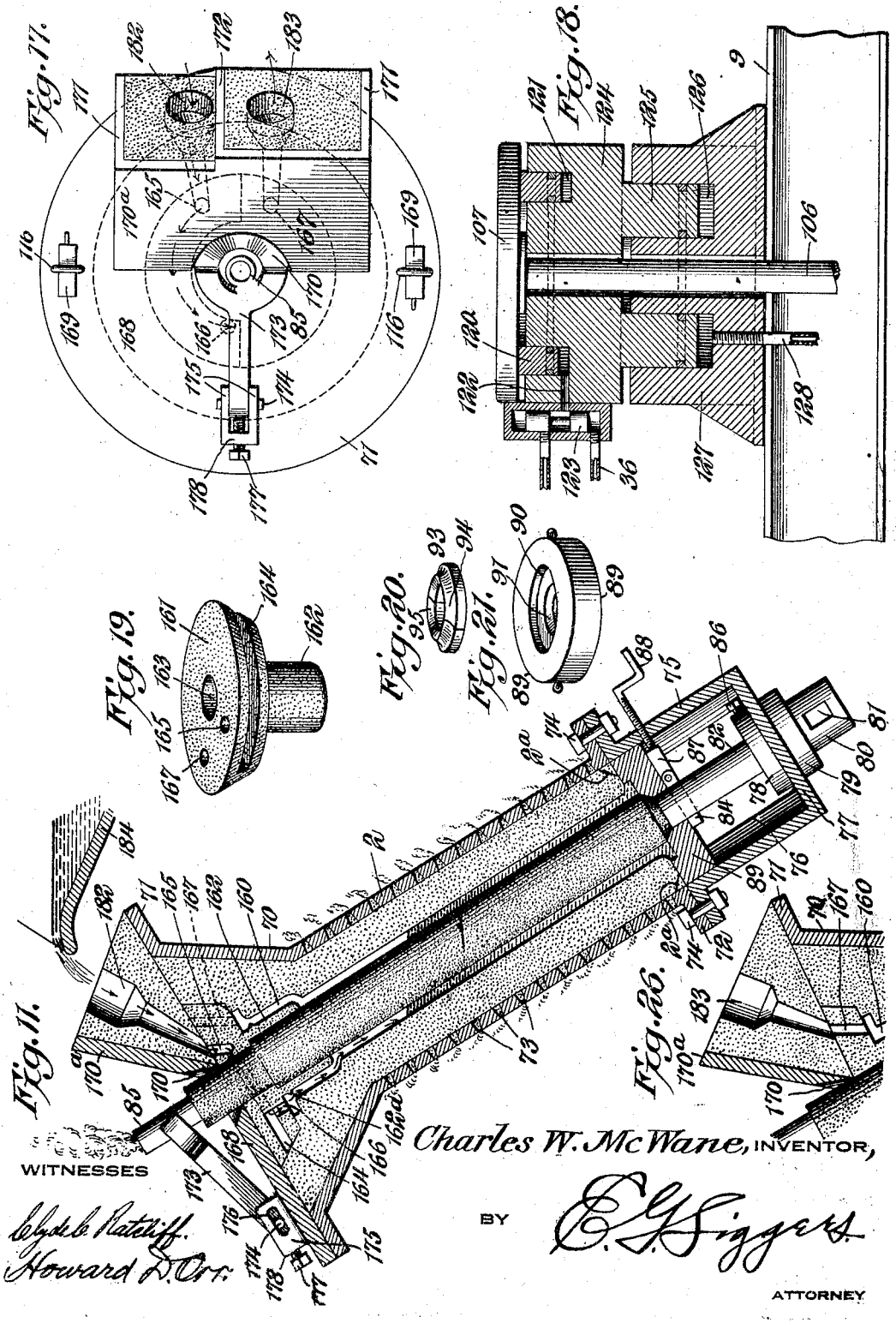

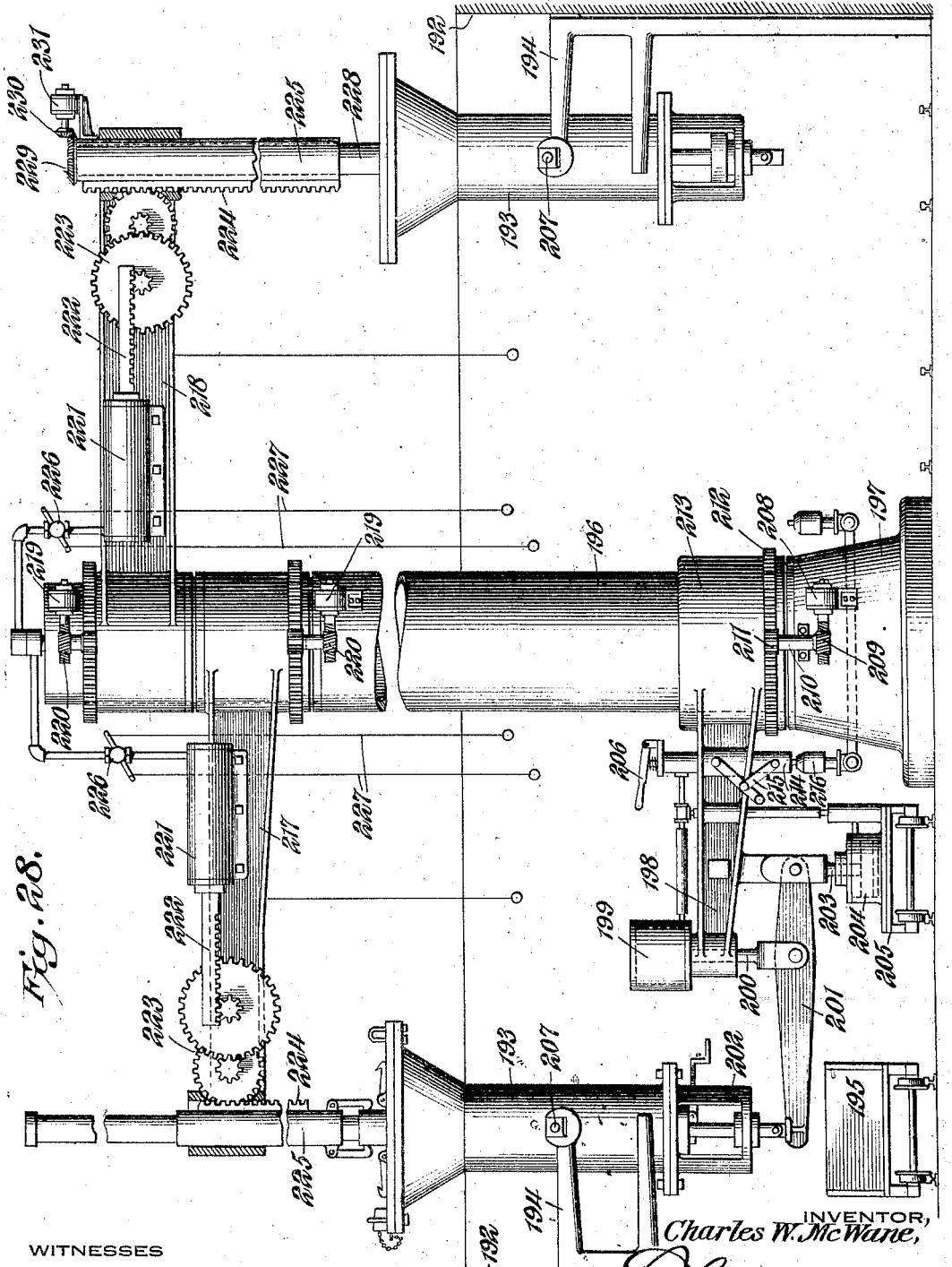

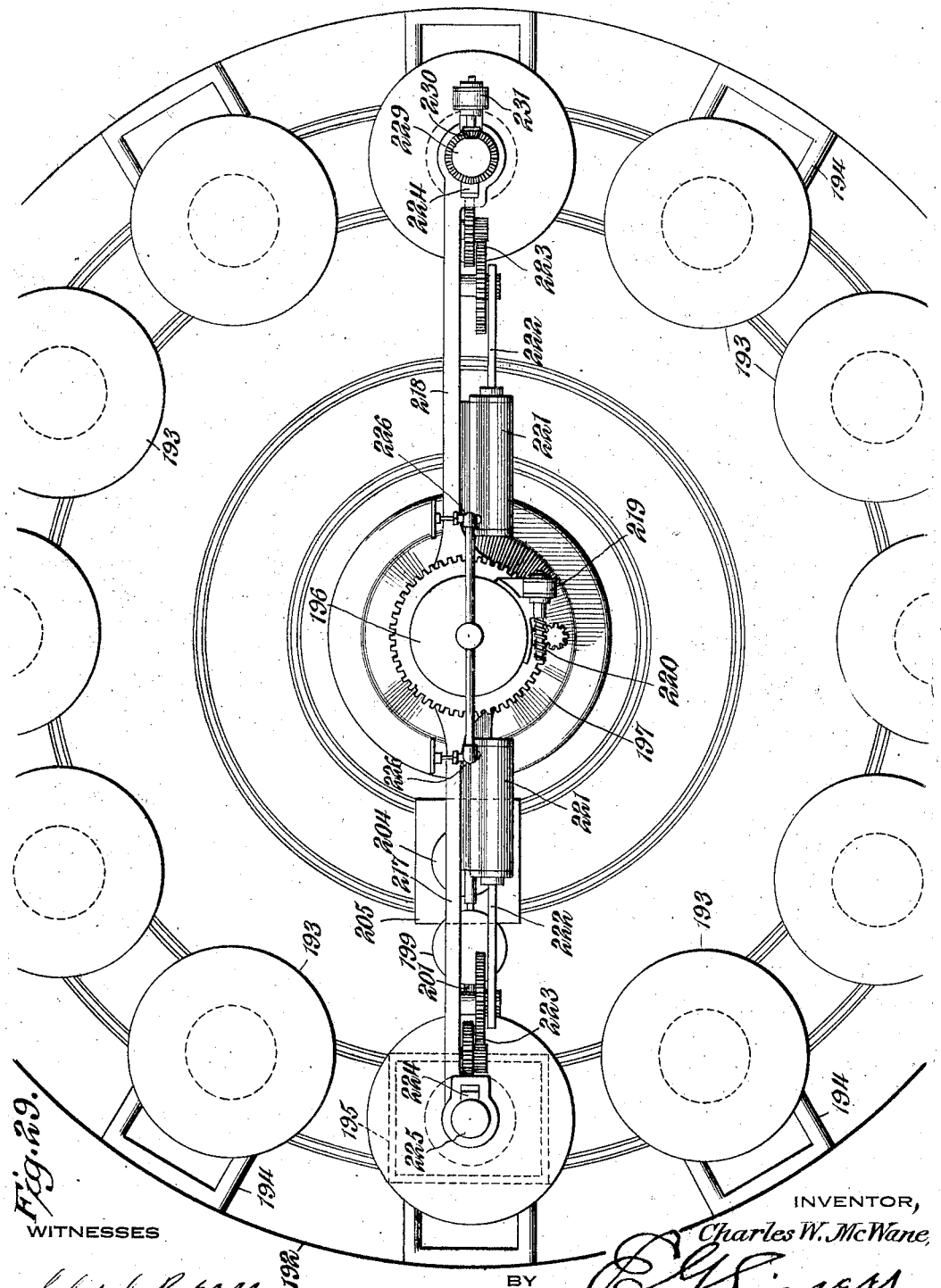

Patented June 2, 1925.

1,540,700

UNITED STATES PATENT OFFICE.

CHARLES WILLIAM McWANE, OF LYNCHBURG, VIRGINIA.

METHOD OF MAKING CAST-IRON PIPES.

Application filed March 27, 1923. Serial No. 628,026.

*To all whom it may concern:*

Be it known that I, CHARLES W. McWANE, a citizen of the United States, residing at Lynchburg, in the county of Campbell and State of Virginia, have invented a new and useful Improvement in Methods of Making Cast-Iron Pipes, of which the following is a specification.

This invention relates to the method of making cast iron pipe, either of the bell and spigot, flanged or double bell types, and for making other similar tubular or hollow castings.

The prime object is to improve and to simplify generally the methods employed for the production of such castings, in order to secure the best results with the least amount of labor, by the elimination of many of the cumbersome, laborious, dangerous and time-consuming steps or operations usually employed in ordinary foundries engaged in such manufacture.

In the method of performing this work by the herein disclosed means, not only have the aggregate number of steps or operations been reduced, but the various steps employed have been simplified and condensed, or coupled together in a manner to effect a great saving of time, thus reducing the cost of production in addition to which the various arrangements of the means employed gives to the operatives a degree of safety heretofore impossible by reason of the great amount of handling of the flasks, cores, etc., which is ordinarily required.

To accomplish these results, the improved method contemplates the making of the sand mold within the flask while in a vertical position simultaneously with the making of the core in exact longitudinal alinement within the mold at practically one operation, the said flask being permanently mounted in a pit, from which it is designed not to be removed. A plurality or battery of said flasks are employed in the pit and the latter is preferably of rectangular shape and adapted for a line of flasks on each long side thereof, whereby a double operation may be progressing at all times on opposite sides of said pit, the means for operating on the molds in the making thereof and in the final pouring of the metal being handled by overhead travelling cranes or carriages.

Another novel feature of the invention is the provision of means whereby any one of the flasks, after having the mold and the core properly formed therein, may be tilted and supported in an inclined position, for the reception of the molten metal, thus making use of the mold itself as a gateway, the inclined walls of which receive the metal and permit the latter to roll downwardly below the core, maintaining its level around the same and filling the mold to the top, without damage to the sand of the mold or the core. By tilting the flask to a predetermined degree, it is not necessary to provide core supports within the mold, thus effecting another considerable saving in the cost of production. The tilting of the flask also enables the use of green sand in making both the mold and the core, as such sand will adhere sufficiently, while in an inclined position, both to the mold and the core bar; and furthermore, the sand will not be disturbed by the rolling action of the metal, the weight of which is on the under side of the mold proper, and rises with a relatively gentle action around the entire core and the sides and upper wall of the mold. By making it possible to use green sand exclusively in making the mold and the core, another great saving is effected by the elimination of the separate making and drying of the sand over drying ovens, as is the general practice.

A further advantage found in the use of green or moistened sand for the making of the mold and core, is that the molten iron when contacting with the green sand tends to make the iron tougher, and closes the pores of the iron, giving a closer texture to the finished pipe or other casting, thus resisting the corrosive action of the elements to which the pipe may be subjected.

In addition to the above the invention provides for the use of a flask composed of a single casting in the form of a cylinder, having the necessary flared mouth or upper end for the reception of the head core, etc. to form the bell end of the pipe, said flask, as well as the core bar or barrel being provided with venting means for the escape of the gases formed in pouring the metal, and a movable bottom for confining the sand when being rammed or jarred into compactness by jarring mechanism carried by the work car, or for releasing the sand when the same is being jarred out, after the pipe is cast and cooled. By forming the flask as a single unit, the tedious and complicated operations of clamping and unclamping the hinged halves of the usual form of flask is eliminated, these operations necessitating the moving of the heavy, cumbersome, flasks back and forth between the pit and knock-out bars.

In the making of pipe or analogous objects in accordance with the means and methods herein employed, it will be seen that the flasks and core barrels remain within the pit at all times, and the materials are brought to the same for the purpose of making the mold and the core, and the latter are formed by mechanisms which are likewise, in turn, brought to and introduced into the flask, and all the necessary steps taken by mechanical means which perform their functions without disturbing the green sand of the mold and core by obviating the necessity for any moving or shifting of the flasks.

A full and complete understanding of the invention may be obtained from a consideration of the following detailed description, taken in connection with the accompanying drawings forming a part of this specification, it being understood that while the drawings show practical forms of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a plan view of a pipe foundry pit equipped and constructed to cast pipe or other similar article in accordance with the present invention;

Figure 2 is a transverse vertical sectional view through the same;

Figure 3 is an enlarged, vertical section through one of the pipe flasks and illustrating the initial step in the formation of the mold and core therein prior to the casting of the metal;

Figures 4 and 5 are similar views showing subsequent steps, in order;

Figure 6 is a similar view showing a following step, drawn on a smaller scale, and including a portion of the flask support and a portion of the overhead structure of the travelling crane and also including the means for lowering and pulling the pipe pattern;

Figure 7 is a view like Figures 3, 4 and 5 and showing a step in the operation following that shown in Figure 6;

Figures 8 and 9 are similar views of the flask showing successive steps following that of Figure 7;

Figure 10 is a transverse section through the pit and showing a step following that of Figure 9 and drawn on a smaller scale;

Figure 11 is a view similar to Figure 9, but showing the flask tilted and the metal being poured thereinto, which may be called the final step in the operation of forming a cast iron pipe;

Figure 12 is a horizontal section taken on the line 12—12 of Figure 3;

Figure 13 is a horizontal section taken on the line 13—13 of Figure 4;

Figure 14 is a horizontal section taken on the line 14—14 of Figure 5;

Figure 15 is a top plan view of the subject matter of Figure 5;

Figure 16 is a top plan view of the subject matter of Figure 8;

Figure 17 is a top plan view of the subject matter of Figure 9;

Figure 18 is an enlarged vertical section through the means for elevating and jarring the flasks;

Figure 19 is a detail perspective view of the dry sand head core used to direct the flow of the metal and to form the abutting end of the bell of the pipe;

Figure 20 is a detail perspective view of the split bead-ring used to form the spigot end of the pipe;

Figure 21 is a detail perspective view of the detachable or movable bottom of the mold;

Figure 22 is a horizontal section taken on the line 22—22 of Figure 2 and illustrating the base of the flask support or stand;

Figure 23 is a detail elevation of a portion of the mold facing device for applying silver lead or other facing material to the mold and core as shown in Figures 7 and 28;

Figure 24 is a front elevation of the lower portion of the flask showing the manner of mounting the counterweights for assisting in the raising and lowering of the movable bottom of the flask;

Figure 25 is a horizontal sectional view taken on the line 25—25 of Figure 24;

Figure 26 is a fragmentary section showing the method of forming the riser in the runner box of the top plate which permits the escape of the gases from the mold;

Figure 27 is a fragmentary vertical section through the lower portion of the flask, and illustrating the means for supporting the finished pipe within the flask during the process of shaking or jarring the sand therefrom;

Figure 28 is an elevation of a modified form of pit, the same being round or circular and equipped with the essential elements of the invention, mounted on swinging arms actuated about a central axis;

Figure 29 is a top plan view of the same, the detail structure of the flasks being omitted;

Figure 30 is a detail section taken on the line 30—30 of Figure 2.

In the several well known methods practiced in the production of cast iron pipe and analogous articles, the principal cost of the same is due to the great amount of labor required to perform the various necessary operations. The arrangement and construction of the usual type of plants, necessitates that the flasks, some of which weigh hundreds of pounds, must be handled and moved from place to place in the course of the various steps taken in the preparation of the mold, and the preparation of the core for use therein. For instance, in the method of making cast iron pipe, in vertically disposed flasks having dry sand molds and using loam cores, which is perhaps the most popular method, the custom is to first place a series of empty, divided flasks, which are hinged together, into a circular pit, and upon drying ovens or over individual fire boxes located in the bottom of the pit. After said flasks have been clamped together to hold the two hinged halves, they are taken to a stationary jarring machine or jolt rammer, and filled with a moist loamy sand, and rammed or jarred around a suitable pattern, while in the meantime the cores are made at a different place by using a combustible material on a core barrel, and afterwards applying the loam on same, and placing them in the oven. After they are dry they are taken out and another coating of loam applied as well as a coating of blacking, and after they are placed in the ovens, and dried again, they are ready for use. Heat is applied to the molds in the pit after the same have been formed in the flasks, and overhead travelling cranes then bring the cores to the pit and lower the same into the molds, during which operation there is always danger of damaging both the mold and core. After pouring the molten metal into the upright mold, in which operation the falling metal often disrupts the sand causing a defective casting, the casting is allowed to cool, and the flask and casting are lifted out of the pit and placed upon knock-out bars, and the clamps released, the flask opened, and the sand shaken out of the flask. The pipe with the core barrel therein is then carried to a core pulling device where the said core barrel is pulled from the pipe. The flasks are then reclamped and returned to the pit to repeat the operation, while the core barrels are receiving another coating of core material ready for the drying ovens.

As will be seen from the foregoing it requires numerous operations in moving the flasks into the pit, making the molds therein and drying the same, as well as making and drying the cores, setting the cores into the molds, pouring the metal, lifting the flasks, core barrels and pipes, unclamping the flasks, shaking out the sand therefrom, removing the pipes and core barrels from the flasks, pulling the core barrels from the pipes and carrying the flasks and core barrels back to the starting points. Besides these operations require the employment of numerous more or less skilled operatives, and consume a great deal of time at great expense to the manufacturer, and it is no uncommon thing for operatives to be killed or injured by the undue swinging movements of the flasks and cores during transit, or by the toppling over of the flasks while standing on the drying ovens in the pit, such an accident as the latter often causing the entire circular series of flasks to fall and causing deplorable damage and loss of life.

In the improved method of making cast iron pipe or similar articles, none of these defects or disadvantages are present, as practically all of the aforesaid handling of the flasks, cores and pipes has been eliminated, and the pipe is formed complete within the pit in flasks that are not moved therefrom, and the finished pipe drawn from the flasks, thus resulting in safety to the operatives and great saving to the manufacturer in time and cost of production.

Referring to the drawings, and particularly to Figure 1 thereof, there is shown a pit 1 which, in the preferred form of the invention, is rectangular or oblong in shape, the length of the long sides of the same depending on the number of flasks 2 to be used in the pit, as the same are placed side by side, in slightly spaced relation to each other along said sides, as shown.

Each flask 2 is mounted in and supported above the floor of the pit by an adjustable stand 3, which may be adjusted to set the flask accurately either vertically, transversely or longitudinally of the pit to the exact position to be acted on by certain devices carried by an overhead travelling crane or car 4, suitably formed of stout, rigidly connected channel irons, having wheels or rollers 5 traversing rails 6, which are supported by suitable posts 7, located on the floor level and in spaced relation to the long sides of the pit 1, as is best shown in Figure 2 of the drawings.

The depth of the pit depends on the length of the flasks 2 to be mounted therein, and the latter, of course, depends on the size and kind of pipe or other casting to be made, and the stands 3 are so constructed as to support the upper, bell end of the flask, when the latter is adapted for casting pipe, slightly above the ground level, and with the lower, or spigot end of the flask considerably elevated above the floor of the pit, the longitudinal axis of the flask being supported in spaced relation to the long sides of the pit 1, which may be of a length to accommodate any desired number of flasks in a row.

Adjacent to the long side edges of the walls of the pit 1, a pair of rails 8 are suitably supported on the ground level, one on each side and extending the full length of the pit, and somewhat beyond at each end, upon which is mounted what is known as a work car 9, suitably constructed of channel irons rigidly secured together and supported on wheels or rollers 10 traversing the tracks 8.

The overhead crane or car 4 and work car 9 should be equipped with the usual electric motor or other power unit and controlling devices therefor, for moving the same along the overhead tracks or rails 6 and 8, and for actuating the aforesaid devices carried by the crane 4 and work car 9, but no special attempt has been made to illustrate the same in the drawings. It is essential, however, that both the crane 4 and the work car 9 should be brought, in their step-by-step movements along the pit during the several operations necessary in the method of casting herein employed, in exact vertical alinement with the flasks, in order to accurately introduce the aforesaid devices thereinto, and for this purpose each of the cars is equipped with manually operated stop mechanisms which, when set, will automatically stop the cars in the proper positions over the flasks.

As shown in Figure 2, the overhead crane or car 4 has mounted, longitudinally on one side of one of the channel irons thereof, a slidable rod 11, passing through a guide or guides 12 intermediate of its ends, and there connected to plates or irons 13 slidably mounted in guides 14, and provided with depending arms 15 extending below the lower edge of the channel iron. The depending arms 15 are adapted, when the rod 11 is moved longitudinally in the proper direction, to abut against eccentrically mounted, upstanding abutment posts 16 carried by brackets 17 secured adjacent to the upper ends of the posts 7. The posts 16 are mounted on pins or bolts, eccentrically disposed so that the latter may be loosened and the post slightly turned to move the same toward or from the starting end of the pit, to cause the arms 15 to engage sooner or later therewith, as will be understood by an inspection of the detail Figure 30, such arrangement being provided so as to secure the necessary degree of accuracy when the crane is automatically stopped.

In order to shift the stops 15 into and out of the path of the posts 16, an operating lever 18 is mounted on the channel iron of the crane, and is pivoted on a pin or bolt 19 intermediate of its ends, an arm 20 formed integrally therewith extending downwardly and having pivotal connection with one of the plates or irons 13 (Figure 2). By rocking the lever 18 in one direction or the other, as by means of chains or cords 21 secured to either end thereof and depending from the same to be within easy reach of the operatives who stand on the work car 9, it will be seen that the crane or car 4 may be brought to a positive stop directly over any one of the flasks, it being understood that there is a stop post 16 located in proper relation to each flask to accomplish the purpose.

In like manner the work car 9 is adapted to be stopped in proper position with relation to the flasks, by means of shiftable stops 22 extending from each end of one of the channel irons of the structure, said stops 22 being in the form of sliding irons suitably mounted in guides 23, and operated by suitable hand levers 24, connected at their inner ends and within reach of the operators. The outer ends of said stops are adapted to engage eccentrically mounted stops 25 supported by brackets 26 secured to the posts 7 near the ground level (Figure 2). The stops 15 and 22 may be actuated by air pressure, if desired.

Instead of the aforesaid electric motor power equipment for the overhead crane 4, the same, as well as the work car 9, may be caused to travel along their respective tracks in one direction by the means disclosed in Figure 1 of the drawings, in which a weight 27 is employed to pull the carriage along, said weight being connected to a cable 28 passing upwardly and over a drum 29, suitably mounted in bearings at the edge of a shelf 30 formed at the rear end of the pit 1. The drum 29 is mounted on a shaft having a gear wheel 31, which meshes with a pinion 32 carried by the shaft of a winding drum 33, about which is wound a pulling cable 34, the latter being connected to the center of the adjacent channel iron of the carriage or car.

The shaft having the winding drum 33 mounted thereon, is supported in suitable brackets or standards secured to the aforesaid shelf 30, and is extended from the drum 33 where it carries another drum 35, about which there is wound an air hose 36, which is preferably of the wire-wrapped variety to withstand rough usage, and which extends to the car or carriage for supplying air pressure for certain devices carried thereby, constant pressure being supplied to said hose by means of a supply pipe 37, suitably connected to the hose in any well known manner, to permit the drums 33 and 35 to rotate.

When the aforesaid stops are in a position to permit either or both of the cars to move, the weight 27 will exert a pull thereon, and at the same time the air hose 36 will be retrieved through the winding drum 35, and when the carriage is caused to return to the starting end of the pit as by means of a motor indicated at 38 in Figure 1, it will be seen that both the cable 34 and the hose 36 will be paid out to permit the same. The motor is adapted to operate certain gearing having connection with a rack, or through any other suitable means, for returning the carriage or car, it being deemed unnecessary to illustrate such means in the drawings.

The work car 9 is provided with outer platforms 39 located somewhat below the ground level and adjacent to the opposed longitudinal walls of the pit, (Fig. 2), hanger arms 40 for supporting said platforms being so arranged as to pass between said walls and the flaring upper bell ends of the flasks. In like manner inner platforms 41 are supported by hangers 42, and the several platforms 39, 41 are adapted to support workmen in position to readily operate on the flasks, in the operation of forming the molds and the cores.

Mounted on the work car 9 are sand bins 43 located over the rails 8, and having their inner walls substantially in a vertical line with the opposed walls of the pit, the lower walls or bottoms 44 of said bins being inclined towards the pit, and there provided with spouts 45, for conveniently delivering the sand to the operator, who may shovel the same into the open upper end of the flask, which is located substantially three and one-half feet above the ground level.

Between the inner platform 41 there are located and supported by the work car, other transversely disposed sand bins 46 which deliver sand for use by the operatives standing upon the said inner platforms, and as the car travels along from flask to flask, always accurately stopped by the stopping means heretofore described, it will be seen that the workmen carried thereby are always in a convenient position to do their work.

The stands 3 for supporting the flasks 2 each comprise a base member 47 in the form of a cast metal plate, preferably rectangular in form, and having an upstanding back plate or standard 48 formed integrally therewith, the said standard being provided with upper and lower spaced arms 49 and 50 respectively, the said arms extending inwardly towards the center of the pit and adapted to receive, support and steady the flasks in a manner to be described.

The base plate 47 of each stand rests upon a metal supporting plate 51 rigidly secured in the bottom of a relatively small, supplementary pit 52, formed adjacent to the longitudinal walls of the main pit 1, and the stationary plate 51 is provided at one end with an upstanding wall 53 set flush into the wall of the pit, and at the other end an upstanding lug 54 is formed. As shown in Figures 2 and 22, the base plate 47 has a lug 55 formed at the end opposite the upright standard 48, and a set screw 56 traverses the lug 54 of the stationary plate 51 and bears against the last-named lug 55 to force the standard in a direction towards the wall of the pit, a centrally disposed binding screw 57 passing through an enlarged opening 58 in the base plate 47 and into the stationary plate 51 being adapted to be loosened to permit of such action, which may be assisted by a like turning movement of a screw 59, traversing the lower end of the standard 48 and bearing against the wall 53 of the stationary plate 51.

The base plate 47 is also provided with opposite, upstanding lugs 60, arranged flush with the edges of each long side, and adapted to receive screws 61, which bear against the side walls 62 of the stationary plate 51, any one or more of said screws being adapted to be adjusted to give the base plate 47, together with the standard 48 a twisting movement, if desired to properly adjust the same, the central bolt 57 in the enlarged slot or opening 58 permitting of such movement within certain limits (Fig. 22). In addition to the above, the base plate 47 is also provided with set screws 63 passing through the same and bearing against the upper face of the stationary plate 51 to give a slight rocking motion to the standard longitudinally of the pit, all of which may be readily understood by reference to Figures 2 and 22 of the drawings.

The upright standard 48 of the stand 3 is preferably spaced from the wall of the pit, as shown in Figure 6 of the drawing. By this arrangement and construction of the parts, it will be seen that any desired nice adjustment of the flask stand may be made easily and quickly to properly aline with the flasks with relation to the operative devices carried by the work car and the crane.

The upper arms 49 of the stands are each provided with an enlarged head 65, circular in form and provided with a rectangular opening 66 therethrough, the upper end being open, and into this open-ended slot thus formed is placed a rectangular block 67, which is free to rise and fall in the slot but not to turn, said blocks being provided with central apertures for the reception of trunnions 68 formed integrally with the flasks. From this it will be seen that the flasks may be raised or lowered in their bearings to a slight degree, and that the same may be freely turned about their trunnions to permit tilting of the same, in a manner and for a purpose to be explained.

The lower arms 50 are provided with stop lugs 69 extending inwardly therefrom, and in a position to be engaged by the flasks when the same are rocked inwardly towards the wall of the pit, at which time the said flasks are in a vertical position as viewed longitudinally of the pit. The stops 69 on the arms 50 are so arranged as to coact with lugs 69ª on the flask which prevent the tilting of the flask beyond the vertical. When the said flask is elevated in its bearings in the stand 3 the lugs 69ª are still in engagement with the stops 69 and are then in horizontal alinement with other inwardly directed stops 69ᵇ on the arms 50 which prevent tilting of the lower end of the flask towards the center of the pit, while in the act of jarring the flask. When the flask is lowered in its bearings the lugs 69ª are below the stop 69ᵇ and the flask may then be so tilted for pouring the metal as will be later described (see Fig. 12).

Each flask is provided with the oppositely disposed trunnions 68, and is further provided at its upper end with the flared bell end 70, having an outstanding flange 71 extending entirely around the same, the lower end of each flask being also provided with an integral outstanding flange 72, and the body of the flask being provided with vent openings 73 throughout its tubular portion, said openings being tapered outwardly for the purpose of retaining the sand in the mold and at the same time permit the escape of steam, gases and fumes from the sand when the molten metal is poured into the mold. (Figs. 3, 4 and 5.)

At the lower end, each flask is connected by bolts 74 to a cage or housing 75, generally circular in cross section to conform to the shape and diameter of the body of the flask, and having opposite side openings 76, said openings being in vertical alinement with the trunnions 68 of the flask (Fig. 2). The bottom wall 77 of the cage or housing is provided with integral, circular enlargements 78 and 79 respectively arranged above and below the bottom wall of said cage and centrally of the same, the lower enlargement 79 being provided with a depending lug 80, having a transverse opening 81 therethrough for a purpose to be explained, and the upper enlargement 78 being provided with an upstanding, tubular extension or guide 82 arising nearly to the lower end of the flask proper, and having spaced upper and lower, transverse openings 83 therethrough for the reception of a wedge-shaped key 84 which is adapted to be passed through the openings and through a registering opening formed in the lower portion of a tubular core bar 85, which is seated into the guide 82 and is held at its lower extremity by a set screw 86 passing transversely through the upper enlargement and bearing against said tubular core bar (Figs. 3, 4 and 5).

The wedge-shaped key 84 is provided at its larger end with a hinged extremity or abutment block 87, against which is adapted to abut the inner end of a screw-threaded crank 88, which is used to force the wedge through the alined openings of the core bar and the tubular guide 82 by a gentle but powerful pressure, so as to avoid the necessity for hammering or driving the wedge out by blows which might jar and disturb the sand in adjacent molds already formed in neighboring flasks. The provision of the hinged member or block 87 renders it possible to free the wedge from the slots in the confined spaced within the cage, after the crank has been screwed outwardly and the wedge 84 loosened.

Mounted to ride up and down within the cage or housing 75 is a movable bottom for the flask to form the bottom wall of the mold and support the sand thereof while being rammed or jarred by means to be explained, the said bottom 89 (Figs. 4 and 21) being formed of solid cast metal and having a central opening for surrounding the tubular core bar guide 82, the movable bottom 89 having in its upper face an annular channel 90 with a central, tapered depression 91 surrounding the guide 82. When the movable bottom is in its lowered position and resting upon the upper enlargement 78, the wedge 84 is introduced into the lower slot or opening 83 of the guide and bears upon the upper face of said bottom to prevent jarring or moving of the same, as shown in Figure 7, and when the said bottom is elevated into the closing relation to the bottom of the flask, as shown in Figure 4, the wedge is driven into the upper slot or opening 83.

The upper end of the guide 82 has its walls inwardly bevelled or tapered, as at 92, and when the bottom 89 is held in its raised position, the bevel 92 and the tapered depression 91 correspond and form the bottom for the core sand, as shown in Figure 5 of the drawing.

The annular channel 90 formed in the bottom is adapted to receive a split bead ring pattern 93, formed of two identical members semi-circular in form (Fig. 20) and having an external diameter to snugly fit said channel, and an inner diameter the same as the internal diameter of the tubular pattern 96 and in line with the upper edge of the tapered depression 91, the said bead ring having its upper outer edge rounded out, as shown at 94, to form the usual rounded bead at the spigot end of a pipe, and its upper inner edge bevelled at 95, for snugly receiving, centering and supporting the lower end of a tubular pattern 96, which has its lower edge tapered, as at 97, to fit the bead ring and prevent any lateral movement thereof.

The hollow or tubular core bar 85 is provided with a series of outstanding, radially disposed fins 98, to hold the sand on the core bar, the ends of the fins being in spaced relation to the ends of the core bar, and the core bar also provided with rows of perforations 99 between the fins, and somewhat above the same, for the escape of gas, steam, etc., during the pouring of the metal.

In order to facilitate the upward and downward movement of the movable bottom 89, which is very massive and too heavy for one or two workmen to handle easily, counterweights 100 are provided (Figs. 2 and 24), which are suspended on short cables 101 passing up over sheaves 102, thence downwardly next to the walls of the flask 1, and through suitable apertures formed in the flanges of the flask and the bottom cage, where the cables are suitably connected to the movable bottom 89, where it extends through the opening 76, as shown in Figures 24 and 25 of the drawings, such an arrangement enabling a single workman to elevate or lower the heavy bottom at will, after the wedge has been removed.

The work car 9 having the air pressure connection 36 (Fig. 2) is provided with a centrally disposed, depending, tubular guide 105 through which passes an elevating rod 106, which is connected at its upper end to a head 107, mounted for control upon a combined elevating device and jarring device to be later explained (Fig. 18). The lower end of the rod 106 is bifurcated as at 108 and straddles a guide track 109, for preventing any lateral movement of the said rod but permitting the same to be elevated a slight distance. Adjacent to the lower end of the rod 106 there is secured a crosshead 110, consisting of opposite arms extending to a point beyond the centers of the flasks, and there provided with sockets 111 having opposite transverse slots, in alinement with the slot 81 at the lower end of the flask, and adapted to receive a wedge 112, after said crosshead has been elevated and the depending lug 80 has been introduced in the socket.

A description of the operation and method of forming the mold and the core in the flask prior to the pouring of the metal may be advantageously given at this point, without entering further into a minute description of the construction of certain parts cooperating therewith, but such parts will be fully described as they enter into said operations.

Beginning the operation and method of forming the mold, and core in the flasks, it is assumed that the flasks are all empty of sand with core barrels therein, and movable bottoms all lowered and resting upon the upper enlargements 78 as shown in Figure 3, and the flasks supported in proper relation and vertical position in the stands 3 within the pit 1, and abutting against stop lugs 69, and the work car 9, and the overhead crane 4 in position to operate.

The overhead crane 4 having the tubular patterns 96 suspended on lifting tubes 132 by hooks 113, and the inner tubes 133 resting inside of the lifting tubes as shown in Fig. 6, are now moved into position and said patterns, are thus held in suspension above the first two opposite flasks in pit 1, and the overhead car is perfectly alined with the aforesaid two flasks and abutting against stop posts 16, the work car also being alined with the same two flasks, and resting against stop posts 25. Workmen in pit 1 place the bead ring patterns 93 on the movable bottoms 89 of the two flasks, and, assisted by counterweights 100, lift them upwardly until they abut against oppositely disposed lugs 2ª on the flasks. They are afterwards wedged into position by means of the wedge 84, and crank 88, and secured rigidly against the stop lugs as shown in Fig. 4.

The bead ring patterns 93 being positioned on the movable bottoms 89 and said bottoms wedged in position against the stop lugs 2ª, the workmen on work car 9 attach centering devices 114 on the flasks. The said centering device has a central opening 115 to receive the tubular pattern 96, and is secured to the flasks by means of inverted U-bolts 116, and wedges 117 (see Fig. 15). The centering devices being thus secured, tubular patterns 96 are lowered by tubes 132 under control in air cylinder 147, until the bevelled lower end 97 of the tubular patterns 96 rest on the upper bevelled end of the bead rings 93, as shown in Figures 4 and 5.

After the tubular patterns are properly seated, as shown in Fig. 5, a wedge 118 is driven through alined openings in the core barrels 85 and the upper end of tubular patterns 96, after the hooks 113 are detached and the lifting tubes 132, and inner tubes 133 are removed upward out of the way. This wedge 118 is to hold the pattern while the jarring proceeds, and also to steady the core barrel at its upper end. As seen in Figure 15, there is ample space around the enlarged central portion of the centering device 114 and within the cylindrical extension 119 carried by the same, for the workmen on platforms 39 and 41, to shovel in the sand around the pattern, and within the flask, also between the pattern and the core barrel. The said cylindrical extension 119 is secured to the cross bar 114, and has its lower edge bevelled to coincide with the inclined walls of the bevelled mouth of the flask 70 (Fig. 5).

After the flasks and patterns are filled with sand as shown in Fig. 5, the cross head 110, which is several inches below and underneath the two opposite flasks in pit 1, is raised to engage with the depending lugs 80, by means to be described, and held secure by wedges 112 driven into openings 81, and the blocks 67 carrying the flask journals or trunnions 68 are held up in their bearings 66, together with the flask, above the bottom of the bearings 66, the flasks resting on the cross head 110, so that when air is applied to the jarring machine, no jar will be imparted to the stands 3.

In order to elevate the cross head 110 and the flasks, the elevating block 124 (Fig. 18) having the annular chamber 121 provided therein, is also provided with a downwardly projecting annular flange 125 forming a piston which enters an annular chamber or cylinder 126 formed in the base member 127, suitably secured in position upon one or more of the channel irons 9 of the work car, air pressure being supplied, through a pipe 128, under control of a suitable valve (not shown), and having air connection to air hose 36, the connection not being shown. Air is first introduced into the chamber or channel 126 to elevate the rod 106 and maintain it in an elevated position until the jarring of the flasks are completed by the jarring device situated above the elevating chamber 126. The flasks being elevated by the elevating chamber 126, I will now describe the jarring device to jar the molds.

The head 107 at its upper end of the rod 106 is provided with a depending flange 120, forming a piston suitably provided with packing and entering an annular channel 121 comprising an air chamber, into which air pressure is introduced through a port 122, the air pressure being under automatic control by an automatic valve 123, which permits of a jet of air entering the annular chamber and afterwards cutting the same off to allow the piston to drop by gravity, the source of air supply being through the aforesaid hose connection 36. This provides for the jarring motion necessary for packing the sand, and it will be seen that by supplying air to the annular chamber 126 first, and maintaining that air pressure constant, and afterwards supplying air to the chamber 121, the sand is jarred or rammed into compactness within the aforesaid flasks with the patterns therein, compacting the sand within the patterns, as well as within the flasks.

The sand being properly jarred or rammed in the flasks, during which time the air pressure is maintained constant in the lower or elevating air chamber 126, the valve 123 operating the jarring device is closed, and the wedges 112 are then driven out of cross head 110, and valve (not shown) operating the elevating block 124 is closed. The flasks carrying trunnions or journals 68 are dropped to the bottom of bearings 66 in the stands 3, and the cross head 110, being detached by removing the wedges 112, is dropped several inches below the depending lugs 80.

The centering devices 114 are taken off the first two flasks (now packed and jarred by the jarring device) by the withdrawal of wedges 117, and a head pattern 129 (see Fig. 6), is now placed in position at the upper or bell end of the two flasks. These patterns have an exterior form corresponding to the bell of the finished pipe, and consist of a metal ring having a bore to slide over the upper end of tubular pattern 96, and securely fixed to the lower face of a circular head core print 130, having its side walls downwardly tapered and in turn secured to a cross bar 131, which supports the device in place at the top of the flasks. The cross bar 131 extends across the mouth of the flask, and has suitable slots for the reception of the U-bolts 116 and wedges 117, in the same manner as the centering device 114. At the time of removing the said centering device 114, the sand confined within the depending cylindrical extension 119 will either remain intact against the walls of the tubular pattern 96, or if a portion thereof does fall, it is immaterial, as the flaring mouth of the flask is now filled with sand and rammed or packed by hand flush with the top of the flask, and tightly around the head pattern 129 and the core print 130, as seen in Figure 6. The cross bar 131 is relatively narrow and readily permits the placing or shoveling of the sand into the mouth of the flask, and the sand is also filled into and rammed even with the top of the tubular pattern, and around the core bar. The operator at the bottom of the pit now lowers, with the assistance of the counterweights 100, the detachable or movable bottom 89 of the flask upon the upper enlargement 78, by withdrawing the wedge 84, and the bead ring pattern 93 is likewise lowered with said bottom so as to entirely open the bottom of the mold, and allow any falling loose sand to drop out through the openings 76, when the tubular pattern is withdrawn or pulled from the flask, which is now done in the following manner.

The overhead car 4 is shifted to bring the pattern lifting tube 132, having the hooks 113 connected thereto, into position to pull the said pattern, as shown in Figure 6, with the hooks engaged in slots 150 provided in the upper end of the pattern. Within the tube 132 there is mounted an inner tube 133, longer than tube 132, and having its lower end reduced, as shown at 134, and adapted to slide vertically and independently of the outer tube 132. The reduced lower end 134 of the inner tube is directed into the upper end of the tubular pattern 96, embedding itself into the sand and compacting the same more tightly about the core bar. A shoulder 133ª at the lower end of the inner tube causes the same to rest stationary on core barrel 85, while the tubular pattern is being withdrawn over it from the mold. The outer tube 132 passes upwardly and through a tubular guide 135, secured to one of the channel irons of the overhead carriage 4, and is provided with a longitudinally disposed rack 136 adapted to travel through an enlargement formed in said guide 135. Transversely thereof, and longitudinally of said channel iron, is a counter shaft 137, mounted in bearings 138 secured to transverse channel irons of the carriage, and carrying a pinion 139 between said bearings and meshing with the aforesaid rack 136. At an intermediate point the shaft 137 carries another pinion 140 constituting a drive pinion, which is in mesh with a gear wheel 141 mounted on a stud shaft 142, carried by a depending bracket 143 secured to the underside of said channel iron, the said stud shaft carrying on its other end, beyond the bracket, a pinion 144 which meshes with and is driven by a rack 145 connected to a piston rod, having a piston head 146 mounted and actuated in a cylinder 147, carried on the upper face of the channel iron and under air pressure having suitable controlling valves. Through this train of gearing it will be seen that when the air is allowed to enter the proper end of the cylinder 147, the lifting tube 132 will be raised or lowered as desired.

The lifting tube 132 when fully lowered is held in such position by a collar or flange 148 at its upper end, which rests upon the upper end of the guide 135, the inner tube 133 extending a distance above the same sufficient to permit the outer tube to lift the tubular pattern 96 entirely free from the upper end of the flask, before the collar 148 engages with a similar collar 149 mounted at the upper end of the inner tube, and when this engagement takes place the inner tube will be lifted thereby.

When the tubular pattern is entirely withdrawn, hooks 151 hinged to cross bar 131 are then engaged in the slots 152 provided in the inner tube 133, after the wedges 117 have been freed from the U-bolts 116. When the collar 148 of the lifting tube 132 in its upward movement engages with the collar 149 of the inner tube to lift the latter, the said cross bar 131, together with the head pattern 129 and core print 130, are also lifted from their positions in the sand, and the mold is left free with the completed core standing therein, as indicated in Fig. 7 of the drawings, and ready to receive a coating of silver lead or other suitable foundry facing. A protective cap 153 is now placed over the upper end of the core, and the cap fitting on the reduced end of the core, which was formed by the reduced lower end 134 of the aforesaid inner tube 133, the said cap being in the form of an imperforate tube having one closed end 154, which rests on the upper end of the core barrel 85.

In order to prevent the flask from rising when the tubular pattern is being withdrawn from the mold, holding down means, such as legs 186, carried by work car 9 (see Fig. 2) and pivoted thereto by pivots 187 are swung into vertical position with their lower ends bearing upon the edge of the flask and hold the same in its bearings.

The tubular pattern now being withdrawn, together with the head pattern and core print pattern, etc., and the protective cap placed in position over the top of core, a facing device in the form of a tube 155, relatively thin, so as to be easily lowered into the mold without danger of touching and damaging the side walls of the mold or core, is now lowered by means of a lifting tube 155ª, and a rack 156 through means similar to the means for raising and lowering the tubular pattern 96. (Fig. 28 also shows this device with tube 228 in flask 193). The lower end of the thin tube 155, Fig. 23 and Fig. 28, is equipped with a brush, and this brush is circular, as shown at 157 in Fig. 23. It is formed of camel's hair or other soft material, and silver lead may be introduced both inside and outside of the brush by means of a series of holes 158 formed in the tube and above the brush (see Fig. 23).

A rotating movement of the tube 228, which corresponds to tube 155, made by an electric motor 231, as shown in Fig. 28, as the tube is lifted upwardly, is sufficient to apply the facing material to the mold and core in a uniform manner, and the mold is ready for the step illustrated in Figure 8 of the drawing. As seen in Fig. 7, the removal of the head pattern 129, and the core print 130, forms a seat 159 at the upper end of the mold, said seat having downwardly inclined walls, and communicating with another space 160 conforming to the shape of the bell end of the pipe, and defining the outer wall thereof when the metal is poured.

A prepared dry sand head core 161 (see Fig. 19) is now placed in position in the aforesaid space or seat 159, the outer walls of the same being tapered to fit the seat, and having an extension 162 located in the space 160, and adapted to define the inner wall of the bell end of the pipe, as clearly shown in Fig. 8. The extension 162 is provided adjacent to its upper end, with a circumferential rib 162ª, which when the metal is poured, forms the lead ring or groove in the bell of the finished pipe, as will be understood. The head core which has been previously prepared and baked to give it the necessary strength, is provided with a central bore or passageway 163 of a diameter to snugly fit the core proper, and to be slid over the protecting cap 153 which prevents any damage to the core. The head core, which is shown in detail in Fig. 19, is provided with a semi-circular channel 164 extending in from the tapered wall thereof, and having an inclined entrance opening or gate 165, through the upper wall of the channel and located adjacent to one end of the same, and an outlet 166 through the bottom wall of the channel and located near the other end of the same and communicating with the space 160. When the head core is placed in position, care must be taken to locate the passage or outlet 166 at a point close to the adjacent wall of the pit, so that, when the flask is tilted towards the same, as will be described, the said outlet 166 will be at the lowermost point of the head core, and in position to permit the metal to gently flow down and along the inclined lower wall of the mold. Beyond the end wall of the channel 164 having the inlet opening 165 and in spaced relation to the same, there is another passageway 167, constituting a vent or riser for the escape of gases, etc. from the mold when the metal is poured, and this outlet opening is located at the highest point of the tilted mold, as will be seen.

With the head core in position the upper surface of the same lies flush with the sand in the flared upper end of the flask, and any sand loosely clinging to the walls of the mold or the core may freely fall through the space between the same and out through the bottom thereof, the removable bottom members 89 being still in their lowered position.

The workman now raises the bottom, assisted by the counterweights, and locks the same into elevated position by the wedge 84, gently forced into position by the crank 88, the protective cap 153 is removed, and sand packed into the space in the core left thereby, after which the upper end of the flask must be covered. In order to confine the sand at the top and to protect the same when the flask is tilted, a cover plate 168 is secured to the upper end of the flask, as best shown in Figures 9, 11 and 17. This cover plate is round and of the same diameter as the flange 71 of the flask, to which it is adapted to be held by wedges 169 passing through the aforesaid U-shaped bolts 116 (Fig. 17). The cover plate is provided with a central, tapered passageway 170 adapted to freely receive the core bar and core, and carries a runner box 170 whose upper wall is formed at an angle to the cover plate and is provided with triangular end walls 171 and a triangular intermediate wall 172 arranged somewhat closer to one end wall than the other, as shown in Figure 17.

In order to brace the core when the flask is tilted, a bracing yoke 173 pivotally mounted at 174 between spaced ears 175 formed integrally with the cover plate, which may be of cast metal, said ears having longitudinal slots 176, in which the ends of the pivot 174 is adapted to slide, in order to adjust the yoke 173 to properly engage and hold or brace the core bar 85 and the core, said adjustment being held by a set screw 177 passing through an end wall 178 joining the rear ends of the ears 175 (see Figs. 9, 11 and 17).

The upper or inner end of the yoke 173 engages the end of the core bar projecting beyond the core material, and relieves the head core of all strain from the weight of the core when the flask is tilted and the said yoke is in an inclined position with relation to the cover plate 168.

With the cover plates locked in position, the flasks are then tilted, as shown in Figure 10, and the same are held in such position by means of hooks or links 179 pivoted at one end 180 to the lower arm 50 of the stand 3, and engaging over a stud 181 projecting from the side of the flask. It will be noted, by reference to said figure, that the flaring mouth of the flask and the cover plate are held in slightly spaced relation to the side wall of the pit when the flasks are tilted, so as to avoid any damage to the green sand mold and core which might be imparted thereto from incidental jarring of the ground or pit, due to the jarring of adjacent flasks, were the flasks in contact with the wall of the pit.

After the flasks are tilted and locked in such position, the operators on the work car then fill the runner box on both sides of the intermediate partition thereof with green sand, completely fitting the same in and around suitable removable gate sticks (not shown) which have been introduced therein and supported in position to form the pouring gate 182, shown in Figures 11 and 17, the inner reduced end of which connects with the inlet opening 165 in the head core, and to form the outlet gate or riser 183 in the other or larger compartment of the runner box, the inner reduced end of said riser communicating with the outlet opening 167 of the said head core.

As shown in Figure 11 the metal is poured, after the said gate sticks are removed, into the gate 182 which, as will be seen in Figure 17, is somewhat lower than the compartment having the riser 183 formed therein, so that a slight spilling or overflowing of the metal in the inlet gate will not flow into and damage or close the outlet or riser and dangerously interfere with the escape of gases.

The metal enters through the gate 182, traversing the opening 165, thence passing through and around the semi-circular channel 164 to the lower outlet 166, which allows the molten metal to gently flow along the inclined lower wall of the mold in a rolling fashion, there being no damaging drop of the metal as in vertical pouring, and as the metal reaches the bottom of the mold and begins to fill, the level is maintained around the core and gradually rises touching evenly the walls of the core and the walls of the mold with no jars, no splashing and no deleterious effects to the same.

When the top has been reached and the metal fills the gate 182, the pouring ceases and the ladle 184, which may be suitably mounted on or carried by the overhead carriage 4 is removed by a shifting of the same, after which the locking members 179 (Fig. 10) are detached from the flasks, and the latter are tilted back into upright position and abutting against the stop lugs 69. The cover plate 168 with the runner box and other parts carried thereby, is removed from the flask, after the cast metal has been allowed to cool sufficiently, and the removable bottom 89 is lowered. Cars 168 mounted on suitable tracks running beneath the rows of flasks and longitudinally of the pits (Fig. 2), are moved into position, and in order to remove the sand from the flask and the pipe casting, and around the core barrel, the cross head 110 is moved into position, and connected to the lug 80 by wedge 112, whereupon the flask is given a quick jarring motion, thus removing all the sand therefrom, into cars 188 (Fig. 2) and allowing the cast pipe to drop sufficiently to be arrested by the inturned arms 189 of gravity dogs 190, which are pivoted at their upper ends, as at 191 between suitable ears formed on the opposite sides of the flask (Fig. 27). These dogs are designed to automatically catch the pipe and support the same until lifted out by the pulling means of the overhead carriage 4, (not shown on drawings), and to prevent the same from falling to the bottom of the cage or housing 75 when freed from the sand, and the said dogs may be turned upwardly and held out of the way when the various preceding operations are taking place, by means of latches 190$^a$ pivoted on the sides of the flask above the pivots 191 and having bevelled ends to engage the bevelled ends of arms 190$^b$ forming part of the dogs, as shown in Fig. 27.

The cars 188 on opposite sides of the pit are especially designed to receive the sand as it falls from the flasks while being jarred, and the sand may be conveyed thereby to a sand pit, at one end of the pit 1, to be taken therefrom by elevating means and carried to the ground level to be re-tempered and placed in bins above the work car, which receives its supply therefrom, none of which has been shown in the drawings.

From the foregoing description of the construction and mode of operation of the means for casting pipe and other similar objects, it is thought that the advantages set forth in the preliminary statements will be readily appreciated, and no further recital of the same will be deemed necessary. It will be seen that with the rectangular pit as herein constructed and equipped, with the one-piece flasks supported therein in a manner to have the molds and cores formed therein simultaneously and adapted to receive the metal without removal from the pit at any time, all the disadvantages incident to the ordinary method of casting pipe have been eliminated, and with the present outfit, the production of pipe may be greatly facilitated with a saving of time and at a much reduced cost of manufacture.

In Figures 28 and 29 of the drawings, there is illustrated a somewhat modified form of pit and apparatus for making the molds and cores, though the steps in the operation are identical with the first-described form of the invention. In this form of the invention, the pit 192 is round, and may be of a diameter to accommodate any desired number of flasks 193 held, as before, by the stands 194, the flasks and the stands being formed in the same manner as the first described form. Beneath the circular series of flasks located adjacent to the circular walls of the pit, is a circular track upon which are mounted a car or cars 195.

Located at the center of the pit is a stationary, tubular post 196 suitably mounted on a base or pedestal 197, and adjacent to the base or pedestal, the post carries a revolving arm 198 at the outer end of which is a vertically disposed cylinder 199 containing a reciprocating piston, having a rod 200 connected therewith and extending through the bottom of the said cylinder, where it is connected intermediate of its ends to a lever 201 having means for connection to the lower end of the cage or housing 202 of the flask, similarly to the first form of the invention. The inner end of the lever is connected to the upper end of a piston rod 203, arising from a piston actuated in a cylinder 204 carried by a car 205 mounted on a circular track located adjacent to the post 196.

When air is admitted to the cylinder 199 through suitable valve control 206, the lever 201 is pulled upwardly about its inner pivot on the upper end of the rod 203, and this movement elevates the trunnions 207 of the flasks in their bearings in the upper arms of the stands 194, just as is done in the other form of the invention, and by admitting air into the cylinder 204 an intermittent movement may be imparted to the lever 201 to give the necessary jarring action to the flasks.

The arm 198 together with the parts carried thereby may be caused to rotate about the axis of the post 196 by means of a small electric motor 208 mounted on the base, and having a worm connection 209 to an upright shaft mounted in a bearing 210 on said base, and provided with a pinion 211 at its upper end, which is in mesh with a gear ring 212 secured to the hub 213 carrying the said arm 198. Air connection may be had at any of the points at which the arm 198 may be stopped opposite the positions of the flasks, by means of a socket 214 vertically movable by means of a toggle lever arrangement 215, the said socket being depressed into connecting engagement with one of a series of nipples, provided with suitable check valves, for preventing the escape of air when not in use, and suitably mounted for constant air pressure on the base or pedestal.

At the upper end of the post 196 there are mounted independently swingable booms or arms 217 and 218 respectively, each having a drive motor 219 and gearing 220 for rotating them above the central axis, to bring the same into operative relation over the mouths of the flasks.

The arms 217 and 218 each carries a cylinder 221 having a piston rod provided with a rack 222 adapted to actuate speed-increasing gearing 223, which operate on racks 224 carried by lifting tubes 225 for the purpose of performing the several operations as have been explained in connection with the first described form of the invention, air being admitted to the cylinders through pipes controlled by valves 226 operable by cords 227.

The facing device shown in connection with the arm 218 is adapted to have a rotary movement in applying the silver lead to the mold and core, and the tube 228 which is equipped with the brush at its lower end, is passed through the tube 225 and carries a bevel gear 229 at the upper end, which is driven by a pinion 230 mounted on the shaft of a small electric motor 231.

The steps in the operation of forming the mold and core and of positioning the flasks for the pouring of the metal are identical with the first described form of the invention and no further description thereof will be given.

What is claimed is:—

1. In the manufacture of cast iron pipe or the like, that method of making simultaneously a mold and a core which consists in supporting a flask in substantially vertical position, placing a core bar within the flask and securing the same to maintain longitudinal alinement of the core bar, placing and securing a tubular pattern within the flask and around the core bar, and simultaneously filling with green sand the space between the core bar and the tubular pattern and also the space between the tubular pattern and the flask to simultaneously make a core and a mold.

2. In the manufacture of cast iron pipe or the like, that method of making simultaneously a mold and a core, which consists in supporting a one-piece flask having an open bottom in a substantially vertical position with the core bar arranged within the flask and maintained in spaced relation thereto, closing the open bottom of the flask and supporting a ring pattern on said closure, placing and securing a tubular pattern within the flask and around the core bar and supported at its lower end on said ring pattern, and finally filling with green sand the space between the core bar and the tubular pattern and at the same time between the tubular patterns and the flask to simultaneously make a core and mold.

3. In the manufacture of cast iron pipe or the like, that method of making simultaneously a mold and a core which consists in mounting a one-piece flask having an open bottom in a vertical position, positioning and holding a tubular core bar having vent openings axially within the flask, closing the open bottom of the flask, placing and holding a pattern centering device at the top of the flask, passing a tubular pattern through said centering device and into the flask, said tubular pattern having an internal diameter greater than the diameter of the core bar, pouring green sand through the centering device and into the flask to form a mold exterior to the pattern and at the same time pouring green sand into the pattern to form a core around the core bar.

4. In the manufacture of cast iron pipe or the like, the method of making simultaneously a mold and a core, consisting in supporting a one-piece flask in a vertical position, with the core bar and pattern within the flask and sustained in proper relation to each other, then filling with green sand the space between the core bar and the pattern and at the same time the space between the pattern and the flask, and while the parts are in vertical position jarring the flask.

5. In the manufacture of cast iron pipe or the like, the method of simultaneously making a mold and a core, consisting in mounting the flask in a vertical position, positioning a tubular core bar within the flask and holding the same from movement, placing and locking a tubular pattern within the flask and about the core bar, pouring green sand into the flask to form a mold exterior to the pattern and at the same time pouring green sand into the pattern to form a core around the core bar, and finally jarring the flask with the core bar and pattern in place and with the parts in a substantially vertical position.

6. The method of making cast iron pipe or the like consisting in simultaneously making a green sand mold and a core with the pattern and core bar within the flask while the flask is in a vertical position, jarring the flask with the pattern and core bar therein, removing the pattern, tilting the flask, pouring the metal while the flask is in a tilted position, returning the flask to its vertical position, and drawing the pipe.

7. The method of making cast iron pipe or the like, consisting in supporting a flask in a substantially vertical position, supporting the core bar in the flask and holding the same from movement, placing a tubular pattern within the flask and around the core bar, filling with green sand the space between the core bar and the pattern and between the pattern and the flask to simultaneously make a core and a mold, jarring the flask, removing the pattern, tilting the flask with the core bar in place, then pouring the metal while the flask is in a tilted position.

8. The method of making cast iron pipe or the like, consisting in supporting the flask having a core bar therein in a substantially vertical position, inserting the pattern within the flask and holding the same in rigid position, simultaneously making a green sand mold and core while the parts are in a vertical position, jarring the flask with the core bar and pattern in place, removing the pattern, tilting the flask, pouring the metal while the flask is in a tilted position, returning the flask to its vertical position, and finally drawing the pipe.

9. The method of making cast iron pipe or the like, consisting in supporting a one-piece flask having a core bar therein and open at both ends, in a substantially vertical position, and holding the same rigidly, closing the bottom of the flask, entering the pattern within the flask in spaced relation to the core bar with its lower end supported by the bottom closure of the flask, filling with sand, jarring the flask to complete the mold and core, removing the pattern, opening the bottom of the flask, applying a facing material to the walls of the mold and the core, closing the bottom of the flask, tilting the flask, and while the flask is in a tilted position, pouring molten metal into the same, returning the flask to its vertical position, and then drawing the pipe.

10. The method of making cast iron pipe or the like consisting in simultaneously making a mold and core while the flask is supported in a vertical position, removing the pattern, inserting a head core at the upper end of the flask, tilting the flask, pouring the molten metal while the flask is held in a tilted position, returning the flask to its vertical position, and finally drawing the pipe.

11. The method of making cast iron pipe or the like consisting in simultaneously making a green sand mold and core while the flask is supported in a vertical position, jarring the flask with the pattern and core bar in place, removing the pattern, inserting a pre-formed head core at the upper end of the flask, tilting the flask, pouring the molten metal while the flask is held in a tilted position, returning the flask to its vertical position, removing the sand in the flask, and finally drawing the pipe.

12. The method of making cast iron pipe or the like consisting in simultaneously making a mold and core while the flask is supported in a vertical position, removing the pattern, facing the walls of the mold and the core, mounting a head core in surrounding relation to the main core at the upper end of the flask, tilting the flask, pouring the metal while the flask is in a tilted position, returning the flask to its vertical position, removing the sand in the flask, and finally drawing the pipe, all of these steps taking place while the flask is in a vertical position, except the pouring step.

13. The method of making cast iron pipe or the like consisting in simultaneously making a green sand mold and core while the flask is supported in a vertical position, jarring the flask with the pattern and the core bar held in place, removing the pattern, facing the walls of the mold and the core, mounting a pre-formed head core in surrounding relation to the main core at the upper end of the flask, tilting the flask, pouring the metal while the flask is in a tilted position, returning the flask to its vertical position, removing the sand in the flask, and finally drawing the pipe, all of these steps taking place while the flask is in a vertical position, except the pouring step.

14. The method of making cast iron pipe or the like consisting in simultaneously making a green sand mold and a core, with the pattern and core bar within the flask and the latter supported in a vertical position, and while the sand is still moist, tilting the flask, and pouring the metal into the flask, with the latter in a tilted position.

15. The method of making cast iron pipe or the like, consisting in making a sand mold and a core, with the pattern and core bar within the flask and the latter supported in a vertical position, tilting the flask, and pouring the metal into the flask, with the latter in a tilted position.

16. The method of making cast iron pipe or the like, consisting in simultaneously making a green sand mold and a core, with the pattern and core bar within the flask and the latter arranged in a vertical position, jarring the flask with the pattern and core bar therein, removing the pattern, tilting the flask, pouring the metal while the flask is in a tilted position, and while the sand is still moist, returning the flask to its vertical position, jarring the flask to remove the sand therefrom and from the core bar, and drawing the pipe.

17. The method of casting pipe, consisting in providing the flask with a sand mold and a sand core, tilting the flask, pouring the metal into the mold while the flask is in a tilted position, bringing the flask to a vertical position, and finally drawing the pipe.

18. The combination with a stand, of means for supporting a flask in the stand, and means for adjusting the position of the stand laterally.

19. The combination with a stand, of a flask supported in the stand, and means for mounting the stand so that it may be rotated.

20. The combination with a flask, of a stand for supporting the flask, said stand comprising a base member and an upstanding back plate, and a supporting plate to receive the base member and having means for adjusting the position of the base member on said supporting plate.

21. The combination with a flask, of a stand for the same having a base member, a supporting plate receiving the base member, means for pivotally connecting the base member to the supporting plate, and means for adjusting the position of the base member on the supporting plate laterally, forwardly and backwardly.

22. The combination with a flask, of a stand for supporting the same, said stand having a base member, a supporting plate receiving the base member, and means carried by the supporting plate and engaging the base member for adjusting the base member in a variety of positions and for holding the same rigidly in each adjusted position.

23. The combination with a flask, of a stand, means for supporting the flask on the stand, said stand having a base member, a supporting plate upon which the base member rests, and screws for adjusting the position of the base member on the supporting plate laterally, forwardly and backwardly.

24. In means for making tubular castings, a flask, a stand for supporting said flask, said stand comprising a base plate and a back plate, said base plate having marginal lugs, a supporting plate located beneath the base plate and having marginal flanges, a central tie bolt passing through the base plate and entering the supporting plate to bind the two together when tightened and to act as a central pivot when loosened to permit the stand to swing on the supporting plate or to be rocked thereon, set screws traversing the base plate and bearing on the supporting plate to rock the base, and set screws traversing the marginal lugs of the base and bearing against the marginal flanges of the supporting plate to impart a swinging or rotary movement of the base plate about the central bolt to adjust the base plate and the stand and the flask carried thereby.

25. In means for making tubular castings, a flask having trunnions, a stand for supporting the flask, said stand comprising a base plate, and a back plate or upright, spaced outstanding upper and lower arms carried by the upright and adapted to straddle the flask, said upper arms having slots open at their upper ends, and bearing blocks mounted in the slots and having openings for the reception of the trunnions on the flask to permit the latter to be elevated, jarred and tilted during the formation of the mold and core within the flask.

26. The combination with a flask provided with trunnions, of non-circular blocks in which the trunnions are mounted, and a stand having supporting arms, each provided with an open-ended slot, non-circular in form, to receive said block, whereby the flask may be given a vertical movement as well as a tilting movement.

27. The combination with a stand provided with supporting arms, each having an open-ended slot, of a flask having opposite trunnions, non-circular blocks receiving said trunnions, said blocks being fitted in the open-ended slots of said arms, means for raising the flasks so as to raise the blocks above the bottoms of the said slots and maintaining said blocks in that position, and means for jarring the flasks while so elevated.

28. The combination with a flask, of means for supporting the same vertically, said means including means for permitting both a tilting and a vertical movement to the flask, and means for elevating the flask for a limited distance and holding the flask from tilting movement.

29. The combination with a stand having supporting arms, of means for supporting the flask in said arms for tilting movement, and means for holding the flask in its tilted position.

30. The combination with a stand provided with upper and lower pairs of arms, of flasks, means for tiltably mounting the flasks in the upper pair of arms, and means connected to the lower pair of arms for holding the flasks in tilted position.

31. The combination with a stand, of means for mounting the flask in said stand for both tilting and vertical movements, and stop mechanism provided on said stand and said flask to hold the flask from tilting movement while being moved vertically.

32. The combination with a stand, of a flask, means for mounting the flask for limited vertical movement and for tilting movement, means for jarring the flask, and mechanism for holding the flask from tilting while being jarred.

33. The combination with a stand, of a flask, means for mounting the flask for limited vertical movement and for tilting movement, means for raising the flask to a limited extent, means for jarring the flask after it is raised, and mechanism for holding the flask from tilting while being jarred.

34. The combination with a stand, of a flask, means for mounting the flask in the stand for both a tilting movement and a limited vertical movement, means for elevating the flask and holding the same in its elevated position, means for then jarring the flask, and means for holding the flask from tilting movement after it is elevated and while it is being jarred.

35. The combination with a stand, of a flask, means for mounting the flask in the stand for a limited vertical movement, means for elevating the flask and holding the same in its elevated position, and means for then jarring the flask.

36. The combination with a stand, of a flask, means for mounting the flask in the stand so as to have a limited vertical movement, means for raising the flask a part of its limited vertical movement and maintaining it in its raised position, and means for jarring the flask while so elevated.

37. The combination with a stand, of a flask, means for mounting the flask in the stand so as to have a limited vertical movement and a tilting movement, means for raising the flask for a part of its limited vertical movement and maintaining it in its raised position, means for jarring the flask while so elevated, and stop mechanism for holding the flask from tilting movement while it is being elevated and jarred.

38. The combination with a stand having two pairs of arms, one arranged above the other, of a flask, means for connecting the flask to the upper pair of arms so that the flask may have a limited vertical movement and a tilting movement, and stop mechanism provided on the lower pair of arms and cooperating with stop devices on the flask to hold the flask from tilting while being elevated.

39. The combination with a stand, of a flask, means for pivotally connecting the flask to the stand, said means providing for a limited vertical movement of the flask, and stop means for the flask, said stop means coming into action when the flask is elevated to prevent the flask from tilting but allowing it to be jarred.

40. In means for making tubular castings, a flask, a stand for supporting the flask, said stand comprising a base plate, a back plate having spaced, outstanding upper and lower arms straddling the flask, the upper arms having means for pivotally mounting the flask therein to permit the latter to be elevated, jarred or tilted, the lower arms having stops to contact with lugs on the flask to prevent the same from tilting in but one direction beyond the vertical.

41. In means for making cast iron pipe or other similar castings, a flask, a stand for pivotally supporting said flask upright, means for simultaneously forming a core and a mold within the flask, said stand permitting the flask to be tilted while pouring the metal into the mold.

42. In means for making cast iron pipe or other similar tubular or hollow castings, a flask, a stand having vertically movable bearings, trunnions carried by the flask and mounted in said bearings, and means for connection to the flask for elevating the bearings and the flask and of imparting a jarring motion to the latter to pack sand therein.

43. In means for making cast iron pipe or other similar tubular or hollow castings, a flask, a stand supporting said flask, coacting means on the stand and the flask for permitting the latter to be elevated and jarred, and means connected to the lower end of the flask for elevating and jarring the same after a mold and a core have been formed therein.

44. The combination with a pit, of a track at the bottom of the same, a crosshead movable along the track, rows of flasks at the sides of the pit, means for connecting the lower ends of opposite flasks to the crosshead, a movable work car arranged above the pit, means for supporting the work car above the ground at each side of the pit, jarring mechanism mounted on the work car, and means for connecting the jarring mechanism to the crosshead.

45. The combination with a pit, of flasks arranged at the sides of the pit, a track at the bottom of the pit between the flasks, means movable along the track and adapted to be connected to the bottoms of the flasks, a work car arranged across the top of the pit, means for supporting the work car above the ground, jarring mechanism mounted on the work car, and means for connecting the jarring mechanism to the connecting means for the flask at the bottom of the pit.

46. The combination with a pit, of a flask mounted therein, a track arranged in a plane below the flasks, a crosshead mounted to run on the track, means for detachably connecting the crosshead to the flasks, a work car arranged above the pit and mounted to move across the pit, a jarring mechanism mounted on the work car, and connecting means between the jarring mechanism and the crosshead.

47. The combination with a work car having a depending guide, of jarring mechanism mounted on the work car and including a movable head, a rod passing through the guide and having its upper end connected to said head, a crosshead carried by the lower end of the rod, flasks, and means for individually connecting the crosshead to the flasks.

48. The combination with a pit and flasks therein, of a crosshead, means for connecting the crosshead individually to the flasks, means for supporting the crosshead to move along the flasks, and jarring mechanisms arranged above the crosshead and connected thereto.

49. The combination with a series of flasks, of a work car supported above the flasks and movable above the same, jarring mechanism connected to and carried by the work car, and means for connecting the jarring mechanism individually to the lower end of the flasks for transmitting the motion of the jarring mechanism to the flasks.

50. In means for making cast iron pipe or other castings, a pit having opposed rows of upright flasks adjacent to the walls of the pit, means for supporting the flasks, tracks arranged beneath the rows of flasks, cars mounted on the tracks to catch the sand from the flasks, and portable means for engagement with the lower ends of two opposite flasks for elevating and jarring the same during the process of simultaneously forming the molds and the cores therein.

51. In means for making cast iron pipe or other castings, a pit having opposed rows of upright flasks adjacent to the walls of the pit, means for supporting the flasks, tracks on the ground level adjacent to the walls of the pit, a work car having wheels mounted on said tracks, said work car bridging the pit and movable longitudinally thereof, and said work car carrying said bins and platforms for workmen to fill the flasks with sand.

52. In means for making cast iron pipe or other castings, a pit having opposed rows of upright flasks adjacent to the walls of the pit, means for supporting the flasks, tracks arranged beneath the rows of flasks, cars mounted on the tracks to catch the sand from the flasks, other tracks on the ground level adjacent to the walls of the pit, a work car having wheels mounted on said tracks, said car bridging the pit and movable longitudinally thereof, and a jarring device carried by the work car, said device comprising a depending tubular guide, a rod passing through said guide and having a head at its upper end, air actuated members or pistons surrounding the rod beneath the head and supported on the work car, valve controls for the pistons to first elevate the rod and then give the same a quick jarring movement, and a crosshead carried by the lower end of the rod and movable with the car to connect with any pair of opposed flasks at the lower ends thereof to give the same an up and down jarring movement after lifting the same off their bearings.

53. The combination with a series of flasks arranged in a pit, of stands, means for vertically supporting the flasks from the stands above the bottom of the pit, tracks laid in the pit below the bottom of the flasks, a car to run on the tracks, and jarring mechanism connected to the bottom of the flasks above the car for jarring the flasks, the car being adapted to catch sand dropping from the flasks while being jarred and also at the conclusion of the casting operation.

54. In means for making cast iron pipe or other similar articles, a pit, rows of flasks located in the pit adjacent to the opposite walls thereof, means for supporting the flasks normally in upright position with their upper, flared or bell ends located above the ground level, tracks arranged on the ground adjacent to the walls of the pit, a work car mounted on wheels traversing said tracks, a jarring device carried by the car for connection with any pair of opposed flasks, posts located adjacent to the ends of the car, adjustably mounted stops carried by the posts near their lower ends, longitudinally slidable bars mounted on the work car, and operating means connected to said bars and adapted to project the outer ends thereof to contact with the said adjustable stops to stop the car in proper position for connection of the jarring device to a pair of opposed flasks.

55. The combination with a flask, of gravity dogs pivoted to the outside of the flask to automatically engage the end of the finished pipe and support the same, and means for holding the dogs out of the way when not in use.

56. The combination with a flask having a sand mold and a sand core and provided with an open lower end, of a movable bottom for closing the lower end of the flask, said bottom forming the sole support for the mold sand and core sand, and when moved away from the lower end of the flask causing the sand to escape from the flask.

57. The combination with a flask having a sand mold and a sand core and provided with an open lower end, of a vertically movable bottom for closing the lower end of the flask, said bottom forming the sole support for the mold sand and the core sand, means for guiding the vertical movement of the bottom, a cage within which the bottom is movable, said cage having side openings, and said bottom being movable so as to uncover said openings in the downward movement thereof, whereby the sand from the flask escapes through said openings upon the movement of the bottom away from the flask.

58. The combination with a one-piece flask open at its lower end, and means for supporting the same in vertical position, of a movable bottom for closing the lower end of the flask, and counterbalancing means for said bottom.

59. The combination with a flask having its lower end open, of a movable bottom for closing the lower end of the flask, said bottom having a central opening, an annular channel in its upper face with a central tapered depression leading therefrom, a bead ring pattern fitted in said channel, a core bar guide below the bottom and connecting with said depression, and a core bar extending through said central opening into said guide.

60. The combination with a flask having its lower end open and provided with stops, of a movable bottom adapted to engage the stops for closing the said lower end, and counterbalancing means for said bottom.

61. The combination with a flask having its lower end open, of a bottom for closing said lower end having a central opening, a core bar guide having its end fitted in said opening, and a core bar having its lower end received in said guide.

62. The combination with a flask having its lower end open, of a movable bottom for closing said lower end having a central opening, a core bar guide having its end fitted in said opening, a core bar having its lower end received in said guide, said bottom having a central tapered depression leading from said guide.

63. The combination with a flask employing a sand core and a sand mold and having its lower end open, of a vertically movable bottom for closing said lower end, a core bar guide on which said bottom is adapted to slide vertically, a core bar having its lower end received in said guide, and means for supporting the bottom in either its closed or open positions, said bottom supporting the sand in its closed position and allowing the sand to escape from the flask in its open position.

64. The combination with a flask employing a sand core and a sand mold having its lower end open, of a cage or housing secured to the lower end of the flask and forming an extension thereof, said cage or housing being provided with openings in its sides for the escape of the sand, and a movable bottom for the flask within the cage or housing, said bottom closing the lower end of the flask and forming a support for the sand in its closed position and allowing the sand to escape from the flask through the openings in the cage or housing when the bottom is lowered.

65. The combination with a flask having its lower end open, of a cage or housing secured to the lower end of the flask and forming an extension thereof, said cage or housing being provided with openings in its sides, a movable bottom within the cage or housing, a core bar guide arranged centrally within the cage or housing and on which the movable bottom is guided, a core bar fitted at its lower end in the core bar guide, and means for holding the bottom so as to close the lower end of the flask, or in a lowered position at the bottom of the cage or housing.

66. The combination with a flask having its lower end open, of a cage or housing fitted to the lower end of the flask and forming a continuation thereof, a movable bottom to close the lower end of the flask, and means for counterbalancing the weight of the bottom.

67. The combination with a flask having its lower end open, of a cage or housing secured to the lower end of the flask and forming a continuation thereof, a vertically movable bottom arranged within the cage or housing, means for holding the bottom in its raised position in closing relation to the bottom of the flask, said bottom forming a support for the sand, a core bar guide below the bottom, a core bar passed through the bottom into said guide, said core bar guide serving also to guide the movements of the bottom.

68. The combination with a flask employing a sand mold and a sand core having its lower end open, of a movable bottom for closing said lower end, said bottom being formed solid, and having a central opening and a channel, a bead ring pattern formed in sections and fitted in said channel, said bead ring pattern being extended above the bottom and spaced from the flask and having its upper inner edge beveled forming a support for the lower end of the pattern.

69. The combination with a flask having its lower end open, of a cage or opening forming a continuation of the flask and provided with openings in its sides, a bottom arranged within the cage or housing and movable therein, means for counterbalancing the weight of the bottom, and means for holding the bottom in its raised position to form the bottom of the flask.

70. In means for making cast iron pipe and similar articles, a flask composed of a single tubular member having venting means, the lower end of the flask being open, a cage or housing carried at the lower end of the flask, and a vertically movable bottom mounted in the cage, a tubular pattern supported by said bottom, a core bar passed through the bottom, said bottom being adapted to be elevated to close the end of the flask and support the sand so as to permit the ramming of sand in the flask to form both a sand mold and a sand core.

71. In means for making cast iron pipe or the like, a flask composed of a single tubular casting, a cage connected to the lower end of the flask and having a bottom wall and side openings, a tubular guide mounted centrally of the bottom wall, a vertically movable bottom mounted in the cage and movable on the guide, and means for raising the bottom and for holding it in its raised position so as to close the lower end of the flask and form a support for the sand therein.

72. In means for making cast iron pipe or the like, a flask composed of a single tubular casting, a cage connected to the lower end of the flask and having a bottom wall and side openings, a tubular guide mounted centrally of the bottom wall, a vertically movable bottom mounted in the cage around the guide, flexible means connected to the bottom and having counterweights to assist in raising and lowering the bottom to close or open the bottom of the flask, and means for locking said bottom in either position.

73. In means for making cast iron pipe or the like, a one-piece flask having vents and a flared upper end, a cage having side openings and secured at the lower end of the flask, a vertically movable bottom mounted in the cage and adapted to close or open the lower end of the flask, a guide carried by the cage, a core bar adapted to be seated in the guide, an annular seat formed in the bottom, a bead ring pattern adapted to be supported in said seat, a tubular pattern surrounding the core bar while resting on the bead ring pattern and extending together with said bar above the top of the flask, the spaces between the bar, the pattern and the flask being adapted to receive sand to simultaneously form a core and a mold in said flask in properly spaced relation after the pattern is withdrawn, said bottom forming a support for the sand when in its raised position, the sand dropping into the cage through the openings thereof upon the release of the bottom.

74. In means for making elongated tubular castings, a flask, means for supporting the flask in upright position, a guide and support carried at the lower end of the flask, a vertically movable bottom adapted to close the lower end of the flask and movable over the guide and support, a core bar held at one end in the guide and support, a bead ring pattern carried by the bottom, a tubular pattern mounted on the bead ring pattern and surrounding the bar, and means for steadying the upper end of the pattern and the core bar while sand is introduced around the said core bar and said pattern within the flask.

75. In means for making tubular castings, a flask having a flared mouth, means to support the flask in upright position and to permit the vertical jarring of the same, a guide carried by the lower end of the flask, a bottom vertically movable into and out of closing relation to the lower end of the flask, a longitudinally disposed core bar adapted to have its lower end seated in the guide, a bead ring pattern mounted on the bottom, a tubular pattern resting on said ring pattern and enclosing the core bar, a cross arm adapted to be clamped to the upper end of the flask and having an opening to receive the tubular pattern to hold the same in alinement with the flask, a cylindrical extension depending from said cross arm and coinciding with the inner walls of the flask to form a continuation thereof through the flared mouth for the reception of green sand into the flask at the same time sand is poured into the tubular pattern and around the core bar, and means for locking the upper end of the core bar to the upper end of the pattern.

76. In means for making cast iron pipe or the like, a tubular, one-piece flask having venting means and a cage connected to the lower end thereof, a vertical, tubular guide carried by the cage in axial alinement with the flask, a vertically movable bottom mounted in the cage and surrounding said guide, stops carried by the flask for limiting the upward movement of the bottom when elevated, means for holding the bottom in elevated position, a tubular core bar having venting means and radial fins and adapted to be seated in said guide and be supported thereby in the longitudinal axis of the flask, a detachable, bead ring pattern mounted on the upper face of the bottom, a tubular pattern adapted to be lowered into the flask around the core bar and in spaced relation to the fins and to be seated on said bead ring pattern and to be centered thereby, means for centering the upper end of the tubular pattern, the space between the core bar and the pattern being adapted to receive sand to form a core at the same time the space between said pattern and the flask is rammed with sand to form the mold.

77. The combination with a flask open at its lower end, of a vertically movable bottom for said lower end, a tubular core bar guide supported at its lower end and projecting into said bottom, a core bar fitting at its lower end in said guide, and a pattern surrounding the core bar and spaced from the same and supported at its lower end by said bottom.

78. The combination with a flask having a bell mouth, of means for supporting the flask in vertical position, a vertically disposed core bar, means for supporting the core bar in vertical position and holding the same from movement, a pattern surrounding the core bar and spaced from the same, a pattern centering device extending across and connected to the mouth of the flask, a tubular extension provided on the centering device, and means connecting the end of the core bar beyond the end of the pattern.

79. The combination with a flask open at its lower end, of a movable bottom therefor, a core guide on which said bottom is adapted to move, a core bar having its lower end fitted in said guide and arranged longitudinally of the flask, a pattern surrounding the core bar and spaced from the same and also from the flask, said pattern being supported at its lower end by said bottom, and means provided at the other end of the flask for holding both the pattern and the core bar from movement.

80. The combination with a flask having its walls perforated and open at its lower end, of a movable bottom for said lower end, a core guide on which said bottom is adapted to move, a core bar having its lower end fitted in said guide, said core bar being perforated and provided with parallel fins on the exterior thereof for a portion of its length, a pattern arranged within the flask and spaced therefrom and from the fins of the core bar, said pattern being supported at its lower end by said bottom, and means for supporting the upper end of both the core bar and the pattern and holding the same in fixed spaced relation to each other.

81. The combination with a flask having a bell mouth, of means for supporting the same in vertical position, a core bar within the flask, a pattern also within the flask and spaced from the core bar and from the flask, a pattern centering device at the top of the flask, and a tubular extension provided on said centering device and fitting in the mouth of the flask to form a continuation of the cylindrical walls of the latter.

82. The combination with a flask, of means for supporting the same in vertical position, a core bar arranged within the flask in a vertical position, a pattern surrounding the core bar within the flask and spaced from said core bar, said pattern extending beyond one end of the flask while the core bar extends beyond both ends of the flask, means for holding both the pattern and the core bar from movement, and separate means for connecting the pattern and core above the flask.

83. The combination with a flask, of a core bar arranged within the same, a pattern also arranged within the flask, means for mounting the flask in a vertical position, means for holding the core bar and the pattern at both ends in fixed relation to each other and to the flask, and means for jarring the flask while the core bar and the pattern are in place.

84. The combination with a flask open at its lower end, of a movable bottom for said lower end, a core bar guide on which said bottom is adapted to move, a cage or housing surrounding said bottom and core bar guide, a core bar having its lower end movable in said guide, a pattern surrounding the core bar and spaced from the same, said bottom forming a support for said pattern, and means at the other end of the flask for holding the pattern and core bar in fixed spaced relation to each other and to the flask.

85. In means for making cast iron pipe or other similar castings, a one-piece flask adapted to be placed upright and having opposed trunnions, a stand having vertically movable bearings for said trunnions to permit tilting of the flask, a vertically movable bottom carried by the lower end of the flask to open or close the same, a core bar mounted longitudinally of the flask, a guide at the lower end of the flask for supporting said bar, a tubular pattern adapted to be supported by the bottom when elevated and in spaced relation to the bar to permit packing of sand between the bar and the pattern and between the pattern and the flask to form the core and the mold simultaneously.

86. A pre-formed head core for insertion over the main core having a substantially semi-circular channel extending inwardly from the outer wall thereof, an entrance opening or gate through the upper wall of the channel, an outlet through the bottom wall of the channel, and a vent for the escape of gases.

87. A pre-formed head core to be inserted over the main core and to close the outer end of the space left by the pattern when the latter has been withdrawn, said head core being provided with inlet and outlet openings communicating with the casting space, and a vent opening.

88. A pre-formed head core having a central bore to fit the main core and provided with a substantially semi-circular channel opening out at the periphery, an entrance opening or gate through the upper wall of the channel and located adjacent one end of the same, an outlet opening through the bottom wall of the channel and located near the other end of the same, and a vent opening.

89. In means for making tubular castings, a flask, means for supporting the flask vertically, a sand core, means carried by the flask for guiding and supporting the sand core at the lower end, a sand mold within the flask and in spaced relation to the sand core, a seat formed at the upper end of the sand mold, a sand head core resting on said seat and surrounding the upper end of the first-mentioned core and closing the upper end of the mold, and an inlet and an outlet passage in said head core.

90. In means for making cast iron pipe or other similar castings, a flask, means for supporting the flask, a core, means carried by the flask for supporting the core at the lower end, means for forming a mold around and in spaced relation to the core, a head core supported at the upper end of the core, means for directing the flow of metal through said head core and into the mold, and coacting means carried by the stand and the flask to permit the tilting of the latter while the metal is poured.

91. In means for making tubular castings, a flask, means for supporting the flask vertically, a core, means carried by the flask for guiding and supporting the core at the lower end thereof, a mold within the flask and in spaced relation to the core, a seat formed at the upper end of the mold, a sand head core resting on said seat and surrounding the upper end of the core and closing the upper end of the mold, said head core having a semi-circular, annular channel extending inwardly from its side walls, an inlet opening connecting the upper end of the mold with said channel at one end of the latter, and a passage connecting the channel with the top face of the head core at the other end of the channel to form a gate for the entrance of molten metal.

92. In means for making tubular castings, a flask having a bell end, means for supporting said flask vertically and permit the same to be elevated, jarred and tilted, a movable bottom adapted to close the bottom of the flask, means for forming a mold within the flask and simultaneously forming a core within the mold, a head core resting on the top of the mold and surrounding the core and having a bell forming extension projecting downwardly into the bell end of the mold, and provided with a circumferential rib, said head core also having a semicircular channel connecting at one end with the mold through an inlet opening and provided with a pouring gate.

93. The combination with a flask, of a head core fitted to the outer end of the main core and adapted to close the outer end of the casting space left by the pattern when withdrawn, a cover plate fitted on the outer end of the flask and holding the head core in place, and a runner box carried by the head plate.

94. The combination with a flask, of a head core fitted to the main core and closing the casting space left by the pattern when withdrawn, said head core being provided with inlet and outlet openings communicating with the casting space, and means for supporting a runner box on the outer end of the flask over the head core, said runner box communicating with the inlet and outlet of the head core.

95. The combination with a flask having a head core engaging around the end of the main core, said head core provided with inlet and outlet openings communicating with the outer end of the casting space left by the pattern when withdrawn, a closure plate for closing the outer end of the flask and engaging the sand in the mold as well as the head core, and a runner box carried by said closure plate and communicating with the inlet and outlet openings of the head core.

96. The combination with a flask, of a head core supported within the sand of the mold at the outer end of the flask and around the end of the core, and having inlet and outlet openings communicating with the casting space left by the pattern when withdrawn, a closure plate, and a runner box carried by the closure plate and having a pouring gate and an outlet gate which respectively communicate with the inlet and outlet openings of the head core.

97. In means for making tubular castings, a flask, means for supporting said flask vertically, a core bar, a sand core, means carried by the flask for receiving the lower end of the core bar within the core and supporting the same, a green sand mold within the flask and in spaced relation to the core, a tapered seat formed at the upper end of the mold, a dry sand head core having tapered sides and resting in the said tapered seat in surrounding relation to the upper end of the core and closing the upper end of the mold, said head core having a channel in communication with the mold through a port and an inlet gate therefor, and an outlet or riser passing through the head core in spaced relation to the gate or inlet and communicating with the mold to allow the escape of gases.

98. In means for making tubular castings, a flask, means for supporting said flask vertically, a core bar, a sand core, means carried by the flask for receiving the lower end of the core bar within the core and supporting the same, a green sand mold within the flask and in spaced relation to the core, a tapered seat formed at the upper end of the mold, a dry sand head core having tapered sides and resting in the said tapered seat in surrounding relation to the upper end of the core and closing the upper end of the mold, said head core having a channel in communication with the mold through a port and an inlet gate therefor, and an outlet or riser passing through the head core in spaced relation to the gate or inlet and communicating with the mold to allow the escape of gases, a cover plate adapted to be clamped to the open, upper, flared end of the flask, and a runner box carried by said plate and having spaced compartments adapted to receive sand, said runner box having a pouring opening in one compartment connecting with the aforesaid gate to convey the metal through the latter, through the channel, and into the mold, and another opening in the other compartment connecting with the riser to carry off the gases.

99. The combination with a flask, of a cover plate for the flask provided with a central passageway, and carrying a runner box whose upper wall is formed at an angle to the cover plate.

100. The combination with a flask, of a plate, and a runner box carried by the plate and having an outlet gate and a pouring gate arranged in juxtaposition, the pouring gate being disposed at a lower elevation than the outlet gate.

101. The combination with a flask, of a cover plate for the flask provided with a central passageway adapted to receive the core bar and core, and a runner box carried by the plate and provided with a pouring gate and an outlet gate, the pouring gate being arranged at a lower elevation than the outlet gate.

102. The combination with a flask, of means for mounting the same so as to be moved to a tilted position, with the core bar therein, a closure plate for closing the outer end of the flask, means carried by the closure plate to engage with the extended end of the core bar when the flask is tilted, and a runner box carried by the closure plate and arranged opposite the said core bar engaging means, said runner box being provided with a pouring gate and an outlet gate.

103. The combination with a flask, means for tiltably mounting the flask, a core bar therein, a closure plate for the outer end of the flask, and means carried by the closure plate for engaging and holding the end of the core bar when the flask is tilted.

104. The combination with a flask, of a core bar arranged longitudinally therein, means for guiding the lower end of the core bar beyond the flask, the upper end of the core bar extending above the upper end of the flask, and a protective cap engaging with the upper end of the core and core bar projecting from the flask.

105. The combination with a flask and a core bar therein, a cap applied to the core bar and surrounding the end of the core projecting from the flask.

106. The combination with a flask, of means for supporting the same in vertical position, said flask being open at its lower end, means for temporarily closing said lower end, a core bar arranged within the flask in vertical position, means for supporting the core bar and guiding it, a pattern arranged within the flask and surrounding the core bar and spaced from the latter, the core bar projecting above the pattern and beyond the flask when mounted in position.

107. In the manufacture of cast iron pipes or the like, mechanism for lifting the tubular pattern from the flask while the pattern is around the core, comprising a pair of tubes, one movable over the other, the inner tube being supported on the core bar and the outer tube having means for engaging the pattern for lifting the same, the inner tube being longer than the outer tube, and means for first moving the outer tube over the inner tube and then moving both tubes together.

108. In the manufacture of cast iron pipes or the like, a mechanism for lifting a tubular pattern from the flask while around the core, consisting of a pair of tubes, one movable with reference to the other, the inner tube being longer than the outer tube and seated on the core bar within the upper end of the pattern, the outer tube having means for engaging the pattern, and means for moving the outer tube with reference to the inner tube.

109. In the manufacture of cast iron pipes or the like, a mechanism for lifting a tubular pattern from about the core while in the flask, consisting of a pair of tubes, one movable with reference to the other, the inner tube being longer than the outer tube and seated at its lower end on the core bar within the tubular pattern and provided with a shoulder, the outer tube having means for engaging the pattern and also provided with a shoulder, and means for moving the outer tube to lift the pattern, the shoulder on the outer tube contacting with the shoulder on the inner tube to lift the inner tube from the pattern and the core bar.

110. In the manufacture of cast iron pipes or the like, a mechanism for lifting the tubular pattern, comprising an inner tube and an outer tube, the inner tube being seated on the upper end of the core barrel and within the pattern and having openings, and the outer tube having hooks engaged in openings of the pattern, the two tubes having coacting elements to cause the outer tube to raise the inner tube at a certain period in the movement of the outer tube, and a crosshead provided with hooks to engage openings provided in the inner tube, whereby the crosshead and the parts connected therewith are raised when the inner tube is raised by the outer tube.

111. In the manufacture of cast iron pipes or the like, a mechanism for lifting the tubular pattern from the flask while the pattern is around the core bar, comprising a pair of tubes, one movable over the other, the inner tube having means for supporting the same on the upper end of the core bar within the pattern, and the outer tube having means for engaging the pattern for lifting the same, the inner tube being longer than the outer tube, and said tubes having coacting elements to cause the outer tube to raise the inner tube at a certain period in the movement of the outer tube, and means applied to the outer tube for first moving the outer tube over the inner tube and then moving both tubes together.

112. In means for making cast iron pipe and similar objects, a circular pit, a series of upstanding flasks arranged around the walls of the pit, stands at the walls of the pit for supporting the flasks to permit the same to be elevated, jarred and tilted, a mast mounted centrally of the pit and extending above the ground level, and a swinging arm rotatably mounted on the mast within the pit and carrying means for connection with any one of the flasks and for elevating and imparting a vertical, jarring motion to the same.

113. In means for making cast iron pipe and similar objects, a circular pit, a series of upstanding flasks arranged around the walls of the pit, stands at the walls of the pit for supporting the flasks to permit the same to be elevated, jarred and tilted, a mast mounted centrally of the pit and extending above the ground level, and a pair of swinging arms rotatably mounted on the mast above the pit, each carrying at its outer end a device for operating on any one of the flasks, and mechanism carried by the arms for operating said devices.

114. In means for making cast iron pipe and similar objects, a circular pit, a series of upstanding flasks arranged around the walls of the pit, stands at the walls of the pit for supporting the flasks to permit the same to be elevated, jarred and tilted, a mast mounted centrally of the pit and extending above the ground level, a swinging arm rotatably mounted on the mast within the pit and carrying means for connection with any one of the flasks and for elevating and imparting a vertical, jarring motion to the same, and gearing carried by the said arm and the base of the mast for coaction to move the arm to any radial position on the mast to aline with any one of the flasks.

In testimony, that I claim the foregoing as my own, I have hereto affixed my signature.

CHARLES WILLIAM McWANE.